(12) United States Patent
Kirkpatrick

(10) Patent No.: US 9,564,061 B2
(45) Date of Patent: Feb. 7, 2017

(54) VOCALIZATION TRAINING METHOD

(75) Inventor: Adam Kirkpatrick, Kennesaw, GA (US)

(73) Assignee: Kennesaw State University Research and Service Foundation, Inc., Kennesaw, GA (US)

(*) Notice: Subject to any disclaimer, the term of this patent is extended or adjusted under 35 U.S.C. 154(b) by 208 days.

(21) Appl. No.: 13/823,495

(22) PCT Filed: Sep. 15, 2011

(86) PCT No.: PCT/US2011/051719
§ 371 (c)(1),
(2), (4) Date: Mar. 18, 2013

(87) PCT Pub. No.: WO2012/040027
PCT Pub. Date: Mar. 29, 2012

(65) Prior Publication Data
US 2013/0177885 A1    Jul. 11, 2013

Related U.S. Application Data

(60) Provisional application No. 61/384,867, filed on Sep. 21, 2010.

(51) Int. Cl.
*G09B 15/00* (2006.01)
*G09B 19/04* (2006.01)

(52) U.S. Cl.
CPC ............... *G09B 15/00* (2013.01); *G09B 19/04* (2013.01)

(58) Field of Classification Search
USPC ........................................................ 434/247
See application file for complete search history.

(56) References Cited

U.S. PATENT DOCUMENTS

| 5,061,186 | A | 10/1991 | Jost et al. |
| 5,794,203 | A | 8/1998 | Kehoe |
| 6,076,011 | A | 6/2000 | Hoover |
| 2004/0194610 | A1 | 10/2004 | Davis |
| 2009/0233769 | A1 | 9/2009 | Pryor |

OTHER PUBLICATIONS

International Search Report and Written Opinion PCT/US2011/051719, mailed Jan. 18, 2012 (18 pages).
International Preliminary Report on Patentability PCT/US2011/051719, mailed Mar. 15, 2013 (7 pages).

(Continued)

*Primary Examiner* — James Hull
(74) *Attorney, Agent, or Firm* — Thompson Hine LLP

(57) ABSTRACT

A method and software supporting the method that improves the perceived quality of a vocalist's and/or singer's spoken or sung tone by teaching how to self-lower the larynx and maintain the lower laryngeal position while vocalizing and singing. An exemplary vocal instruction method comprising instructing a vocalist to self-monitor electromyographic data during singing, the data provided from an electromyograph device, the device comprising electrodes attached to a skin surface covering the vocalist's larynx, translating the data to a graphic display indicating to the vocalist the relative tension or flaccidity of the vocalist's laryngeal depressor muscles, instructing the vocalist to perform at least one physiological and/or anatomical function sufficient to result in lowered real-time tension of the laryngeal depressor muscle assessed by the electromyo-graphic device.

9 Claims, 22 Drawing Sheets

(56) References Cited

OTHER PUBLICATIONS

Englehart. An electromyographic study of preparatory set in singing as influenced by the Alexander Technique. The Ohio State University. 1989 [retrieved Dec. 15, 2011] Retrieved from ProQuest Dissertations and Theses (217 pages).
Hermens et al. Development of recommendations for SEMG sensors and sensor placement procedures. Journal of Electromyography and Kinesiology vol. 10 (2000), pp. 361-374.
Merletti. Standards for Reporting EMG Data. Journal of Electromyography and Kinesiology (1999), 4 pages.

VOCALIZATION TRAINING METHOD

RELATED APPLICATIONS

This application is a National Phase of co-pending International Application No. PCT/US2011/051719, filed Sep. 15, 2011 which claims priority to U.S. Patent Application No. 61/384,867, filed Sep. 21, 2010, each of which is expressly incorporated by reference in its entirety.

This application claims priority to co-pending U.S. Application No. 61/384,867 filed Sep. 21, 2010.

Use of electromyographic (EMG) biofeedback to instruct a vocalist how to maintain a lower laryngeal position while singing to result in an improved vocalized or sung tone. The anatomical and physical components of a maintained lower laryngeal position are quantified. EMG biofeedback provided clear visual and/or aural feedback in real time during vocalization or singing.

EMG has been utilized by physical therapists for more than thirty years to aid in the treatment and recovery of patients suffering from paralysis, paresis, and other neuromuscular problems. EMG biofeedback has also been used in training athletes. Singers, vocal athletes, are evaluated by the sounds they produce.

The method is used to train any vocalist, whether or not the vocalist is a singer. For example, the method is used to train individuals to improve their vocalization. Such individuals may or may not be or aspire to be professional vocalists (e.g., public speakers, orators, recording professionals) or singers. Such individuals may or may not have a condition that hinders vocalization, and may or may be under the care of professionals such as speech pathologists. Such individuals may wish to improve vocalization in order to improve foreign language pronunciation.

The present invention discloses the use of surface electrode EMG biofeedback data as a reliable indicator of the activity of the laryngeal depressor muscles sternothyroid and sternohyoid (ST/SH). The present invention discloses the use of EMG biofeedback in teaching both male and female singers to activate the laryngeal depressor muscles and to maintain a lower laryngeal posture while singing. The present invention discloses that the solution to the problem is that the achievement of this laryngeal posture improves the perceived quality of sung tone, intensifies the "singer's formant cluster," increases the overall amplitude of the tone, and encourages desirable vibrato oscillations.

The following methodology is based on the author's own research study entitled "Teaching Lower Laryngeal Position with EMG Biofeedback," published in the January/February 2012 edition of the *Journal of Singing*. Other larynx-related studies have shown that EMG can be utilized in the treatment of dysphagia, helping patients relearn how to swallow properly post stroke. However, the application of EMG biofeedback in training vocalists to lower the larynx while singing is innovative and opens up the possibility for new lines of inquiry and research.

A vibrant tone results in a free and facile sound. A focused and resonant tone results in a clear, rich, strong, and effortless sound. A singer's tone can be improved from anatomical instructions: stand and maintain an upright position, and release your abdomen and keep your shoulders back when you breathe. There are various breathing and breath management techniques.

Sounds results from a vocalist's anatomy and physiology. The larynx is the anatomical organ that produces vocal sound. One of the most significant physiological differences between the sound produced by a classically trained vocalist or singer and an untrained vocalist or singer is the position of the larynx. Untrained individuals usually vocalize or sing with a natural, speech-like laryngeal posture. For most people, the natural position of the larynx is neutral or slightly elevated. The neutral laryngeal position is easily maintained when one vocalizes or sings, so long as the pitch does not exceed the comfortable speaking range.

As an untrained vocalist or singer ascends the scale and exceeds the comfortable speaking range, increased subglottic breath pressure pushes the larynx higher from beneath, while compensatory tension in the laryngeal elevator muscles reflexively pulls it up from above. The result is a shorter, more constricted vocal tract and a strained vocal tone. Tone is a listener's perception of the sound of the voice.

Classical singing style, because its genesis was primarily in the era of unamplified music, involves lowering the larynx, thus increasing the length and size of the vocal resonator in an effort to amplify the voice naturally. Finding optimal singing resonance can be likened to tuning in an analogue radio with a knob. One can hear the station dimly when the tuner is a little off the mark, but with a lot of white noise in the background. The music is nevertheless audible and pleasant enough to the ear that some are content to listen to it that way. But as one continues to adjust the knob and tune in the station more accurately, so that the frequency of the tuner precisely matches the frequency of the broadcast, the music becomes discernibly louder, clearer, and devoid of background noise.

One turns the allegorical knob of the voice when s/he changes the shape of the vocal tract by moving the articulators, i.e., lips, tongue, jaw, etc. The vocal counterpart to the radio tuner is the air in the vocal tract which, when it vibrates within folds of tissue, has its own distinct frequency independent of the sung note. The vibrating vocal folds are analogous to the broadcast station. When these elements are properly coordinated and in tune, the resultant sound is clearer, louder and more colorful.

The lengthened resonance tract of the voice that results from the lower larynx can be tuned, like an analogue radio, to a greater range of frequencies which can be matched to the fundamental frequency of the sung pitch, or one of its overtones to yield a more resonant, beautiful tone. In other words, the singer's tone benefits from the lower larynx and sounds easier, effortlessly louder, and more even throughout the entire vocal range. When the singer is able to freely tune the resonance tract, i.e., change the shape of the mouth and throat, in its lengthened, dilated and comparatively relaxed state, perceived "breaks" in the voice become less discernable.

It is not always obvious when vocalists or singers fail to achieve the desired lower laryngeal position, especially when singing in a comfortable range. It becomes more obvious as the vocalist or singer exceeds the speaking range and has difficulty reaching higher notes. Strained, high-larynx vocalizing or singing can cause vocal injury and pathology.

The inventive method instructs a vocalist how to achieve and maintain a lower laryngeal position using EMG biofeedback.

Figure 1:
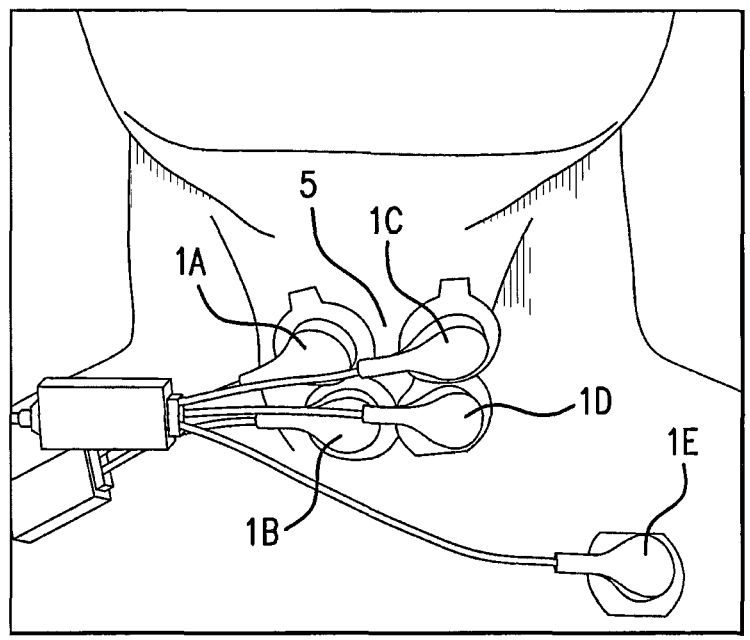
FIG. 1 shows the bipolar surface electrodes attached to the neck.

The electroglottograph (EGG), as known to one skilled in the art, has been used by voice researchers and teachers of singing to gauge the periodicity of vocal fold closure during phonation. The EGG utilizes bilateral surface electrodes over the larynx similar to the configuration used in this methodology, but it does not measure muscle activity. By transmitting an electrical current in the megahertz frequency range through the skin across the larynx, EGG calculates the degree of contact between the vibrating vocal folds during voice production by recording variations in transverse electrical impedance of the larynx. The EGG manufacturers indicate that by utilizing multiple channels and multiple electrodes along the larynx, the device can measure the vertical movements of the larynx during phonation. While the EGG may track laryngeal movement, it is not a gauge of the muscle activity responsible for the laryngeal movement and therefore provides no cause and effect feedback for the user.

As a vocalist or singer ascends the scale and exceeds the comfortable speaking range, increased subglottic breath pressure pushes the larynx higher from beneath, while compensatory tension in the laryngeal elevator muscles reflexively pulls it up from above. The result is a shorter, more constricted vocal tract and a strained vocal tone. It is very difficult to vocalize or sing "high" notes with the high larynx posture because throat tension causes physical discomfort, and the resonance properties of the vocal tract in its shortened and constricted state are not optimal for beautifying and amplifying the sung pitch. Therefore, at this point in the ascending scale, the high-larynx vocalist or singer will either seek relief from increased muscle tension and subglottic pressure by breaking into falsetto and allowing the vocal tract to relax and dilate; or s/he will shout the tone with greater intensity, calling upon sheer muscle power to overcome the vocal difficulty. The result of this strategy is an uneven tone; high notes will either be breathy and weak, or strained and shouted in comparison to the speaking range. The constricted vocal tract may also affect vibrato oscillations, which are often absent or uneven in the high larynx posture.

EMG detects and measures the bioelectric energy emitted by tensed muscles in the body through electrodes. In one embodiment, electrodes are placed on the skin over the muscle of interest. In one embodiment, electrodes are inserted in the muscle by piercing the skin with fine wire contacts. EMG provides real-time visual and/or aural feedback, which indicates the relative tension or flaccidity of muscles by displaying the microvolts ($\mu$V) of electricity emitted. A microvolt is equal to $10^{-6}$ volts, or one-millionth of a volt.

A surface electrode EMG was a reliable indicator of the activity of the laryngeal depressor muscles. EMG biofeedback was effective in teaching singers to activate the laryngeal depressor muscles and to maintain the lower laryngeal posture while singing. Achievement of a lowered laryngeal posture improved the perceived quality of the sung tone, and changed scientifically measureable components of the sound spectrum.

A group comprised of 22 undergraduate voice students and 8 untrained singers were tested. EMG surface electrodes were placed on both sides of each individual's larynx over the thyroid cartilage in an effort to isolate the sternothyroid (ST) and sternohyoid (SH) muscles, the primary depressors and stabilizers of the larynx.

While participants sang, EMG recordings were made bilaterally from the ST and SH muscles of the neck. EMG recordings were achieved using bipolar Ag/AgCl surface electrodes with circular, pre-gelled contact areas of 10 mm and a fixed interelectrode distance of 20 mm (Noraxon USA, Inc.) oriented parallel to the direction of the muscle fibers. The skin was prepared using standard procedures in accordance with the International Society of Electrophysiology and Kinesiology (ISEK) and European Surface Electromyography for the Non-Invasive Assessment of Muscle (SE-NIAM) recommendations for skin preparation.

The electrodes are attached to an EMG device (MyoTrac Infiniti, Thought Technology, Montreal) using sensor cables, The signal from the device is registered on a computer using specialized software (BioGraph Infiniti, Thought Technology, Montreal).

EMG data were recorded with a Noraxon Myosystem 1400A (Noraxon USA, Inc.), amplified ×1000, filtered between 10 Hz and 500 Hz inclusive, sampled at 1000 Hz, and digitized by a 12-bit analog to digital converter.

EMG data were analyzed using MyoResearch XP Master Edition 1.07.09 (Noraxon USA, Inc.) in accordance with ISEK guidelines. EMG data were adjusted for DC-offset, full wave rectified, and bandpass filtered between 5 Hz and 350 Hz inclusive.

As a preliminary control, participants were asked to sing a specified pitch four times on the vowel /a/. The pitch was chosen, according to their voice types and gender, to be a note slightly above the comfortable speaking range, where the increase in subglottic pressure would tend to nudge the larynx upward. The pitches were assigned as follows: baritones—$B^3$, tenors—$D^4$, mezzo-sopranos—$B^4$, and sopranos—$D^5$. Three types of data were recorded for each participant while singing the assigned pitch: (1) EMG output in microvolts; (2) the distance of laryngeal movement from the at-rest position to the singing position in ±centimeters; and (3) audio recordings, which were later judged by a panel of voice experts and graded on a scale of 1-5, where 1=terrible, 2=bad, 3=fair, 4=good, and 5=excellent. Audio recordings were made of all control and test trials utilizing the onboard microphone on a 2008 MacBook Pro laptop computer and GarageBand D8 (Apple, Inc. 2008) recording software. The voice panel was comprised of three university voice teachers, a choir director, and an opera conductor.

The movement of the larynx was measured by drawing a horizontal line on the skin with a dry erase marker over the superior process of the thyroid cartilage (Adam's Apple, 5 in FIG. 1) in the at-rest position. The investigator placed his middle finger over the mark on the neck and gently pressed the cartilage with his fingertips as the participants sang. Based on the perceived laryngeal movement upward or downward across the fingertips, measurements were taken using the method of measuring cervical dilation, where one fingertip's width is estimated to be 1 cm. The perceived movement of the larynx was recorded in+cm for upward movement and–cm for downward movement.

After the preliminary control, a preliminary brief training (about two minutes) was given to lower the larynx by yawning while watching the EMG data biofeedback bar graph for confirmation that the larynx was lowered successfully. Each individual had to successfully activate ST/SH and receive EMG biofeedback confirmation three times before moving on to the test phase. During training, the individual was instructed to yawn while he/she was simultaneously shown his/her EMG results. The individual observed that, during yawning, the EMG output increased on the bar graph display. The individual was then instructed to raise the EMG display bar by yawning three more times for practice.

In one embodiment, the test phase began with the instruction to vocalize and/or sing the same exercise as before in the control phase, but with the instruction to raise the bar on the EMG display while vocalizing and/or singing by lowering the larynx. Participants vocalized or sang the same note and vowel in the test trial as in the control trial. The same methods of measuring EMG data, laryngeal movement, and tone quality were employed.

Paired t-tests were conducted to determine if there were differences between the control and test trials for EMG mean and peak voltage (μV), laryngeal movement (cm), and rating of sung tone (scale of 1 to 5). Repeated measures ANOVA was used to detect any interaction of gender with EMG mean and peak voltage, laryngeal movement, and rating of vocalized or sung tone. All analyses were performed using SPSS 16.0 (SPSS, Inc., Chicago Ill.). Data are presented as mean±SD. Statistical significance was accepted at $p \leq 0.05$.

The test data were compared against the control data to determine if there was a correlation between quality of tone, lowering of the larynx, and increased EMG biofeedback. Selected audio-recorded samples of participants who demonstrated great change in quality of sung tone measurements between control and test trials were subjected to voice analysis software CantOvation Sing & See Professional (Mac) v1.3.2 (CantOvation Ltd) to compare the spectrographic and power spectrum data for measurable differences. The spectrographic data revealed elements of tone quality that were not specifically assessed in the survey, such as relative amplitude/loudness of sung tone, intensity of harmonics in relation to the fundamental frequency, presence or absence of the "singer's formant frequency," and frequency of vibrato oscillations.

There was a significant difference in mean EMG voltage between control (5.07±2.8 μV) and test (8.16±4.2 μV) trials (p=0.000). A significant difference in peak EMG voltage was also found between the control (5.57±3.4 μV) and test (9.70±5.3 μV) trials (p=0.000). The average participant nearly doubled his/her EMG output in the test trial, which indicates that successfully activated ST/SH.

If electrode placement is not sufficiently anterior to the thyroid cartilage, there is risk of interference from the sternocleidomastoid muscles located on either side of the larynx. Care must also be taken that the platysma muscle is not tensed during training. The platysma is a superficial sheet of muscles that covers the neck and inserts at the jaw. It is flexed when one grimaces or frowns. When tensed, there is a characteristic flaring of the neck and wrinkling of the skin of the neck along the vertical fibers of the platysma. Therefore, care must be taken that the participant relaxes the facial muscles and neck while lowering the larynx. Among the thirty participants tested, interference from other muscles was only noticed in one female participant because of poor electrode placement, and one male because of platysma tension.

There was a significant interaction of gender with both mean EMG voltage (p=0.003): control (females: 5.57±3.2 μV, males: 4.31±2.0 μV), test (females: 7.43±3.9 μV, males: 9.25±4.5 μV); and peak EMG voltage (p=0.006): control (females: 6.22±4.0 μV, males: 4.58±2.1 μV), test (females: 8.76±5.1 μV, males: 11.12±5.4 μV). Men were able to achieve greater change in EMG output between control and test trials. Larger muscles produce more microvolts under tension. The comparably larger male larynx and musculature may explain why male participants produced more EMG biofeedback than female participants.

Laryngeal movement was significantly different between the control (0.75±0.49 cm) and test (−0.69±0.73 cm) conditions (p=0.000). This difference represented an average 1.44 cm (0.75 cm upward+0.69 downward) range of laryngeal movement between control and test trials. There was not a significant interaction of gender with laryngeal movement (p=0.150): control (females: 0.659±0.42 cm, males: 0.856±0.57 cm), test (females: −0.500±0.74 cm, males: −0.917±0.69 cm). Males and females were equally successful at lowering the larynx during the test trial.

Some male participants were able to move the larynx as much as 2 cm up and 2 cm down from the at-rest position (4 cm range of motion). Most female participants moved the larynx no more than 1 cm up or down from the at-rest position (2 cm range of motion). Laryngeal movement could not be determined in a small minority of women. The larynx of these women seemed to be drawn inward toward the spine when activating ST/SH, so that the superior process of the thyroid cartilage could not be felt with the fingertips. One possible reason for this anomaly is the action of the omohyoid muscle, which is a laryngeal depressor muscle that originates at the scapula and inserts at the hyoid bone. When flexed, it lowers the larynx, but the omohyoid may also draw the larynx slightly toward its point of origin, which is posterior to the larynx. Another possible reason is that a woman's thyroid cartilage is usually smaller than that of her male counterpart and is, therefore, more difficult to locate. Laryngeal movement could not be determined for one male participant with localized fat deposits in the neck area. Those participants whose laryngeal movement could not be determined were not included in the laryngeal movement statistics.

Figure 17:
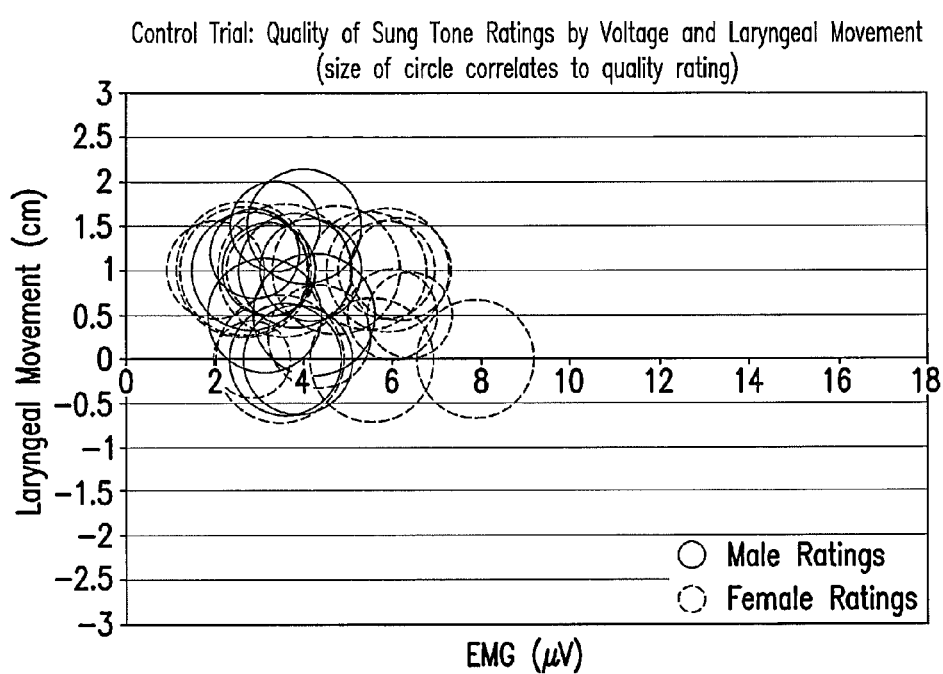
FIG. 17 shows the quality of sung tone relative to laryngeal movement for the control trials.
Figure 18:
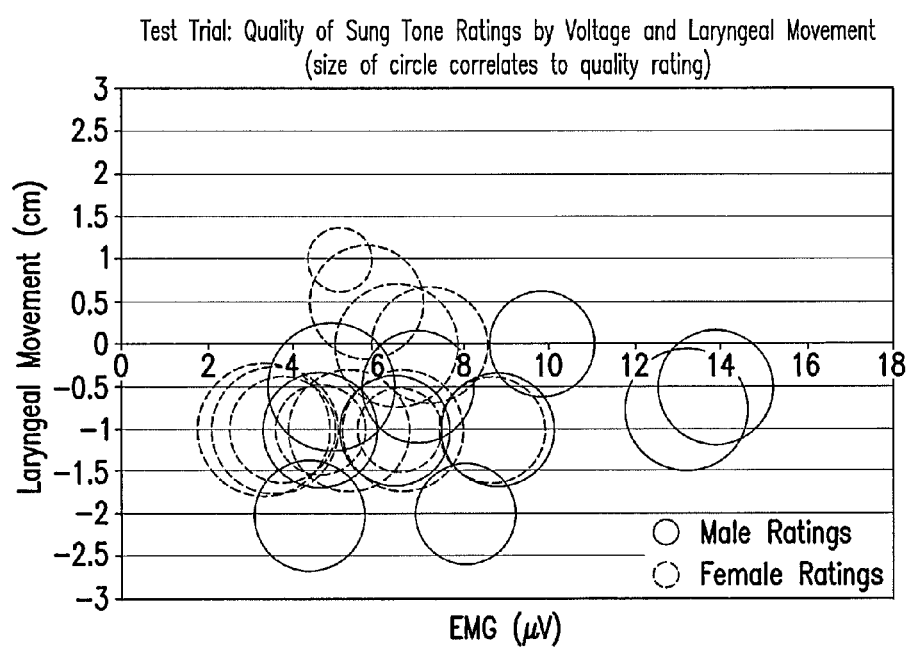
FIG. 18 shows the quality of sung tone relative to laryngeal movement for the test trials.

Rating of sung tone was also found to be significantly different in the control (2.63±0.74) versus the test (3.23±0.78) trial (p=0.000). Using a rating scale of 1=terrible, 2=bad, 3=fair, 4=good, and 5=excellent, the average control trial tone quality rating of 2.63, therefore, represented a quality assessment of better than bad, but less than fair. The average test trial singing was scored at 3.23, better than fair, but less than good. This indicated that the average participant improved by 0.60 points on the 5-point scale, which represented 12% improvement even with this extremely short training period of only a few minutes between control and test trials. Some participants improved by a full point on the scale, or 20%. (FIGS. 17, 18).

Gender did not significantly affect rating of sung tone (p=0.559). The results were: controls (females 2.71±0.86, males 2.50±0.51), and test (females 3.26±0.94, males 3.17±0.49). Both male and female singing improved equally during the test trial.

The base of the tongue attaches to the top of the larynx at the hyoid bone. The vocalist and/or singer must thus appreciate that the tongue is drawn down slightly as the larynx descends. One does not push the larynx into a lower position by tensing and depressing the base of the tongue, as many people erroneously assume. The tone may sound throaty or swallowed if the vocalist and/or singer does not relax the tongue and allows it to assume what may feel like a higher position than normal to compensate for the lower position of the base of the tongue in the low-larynx posture.

Figure 19:
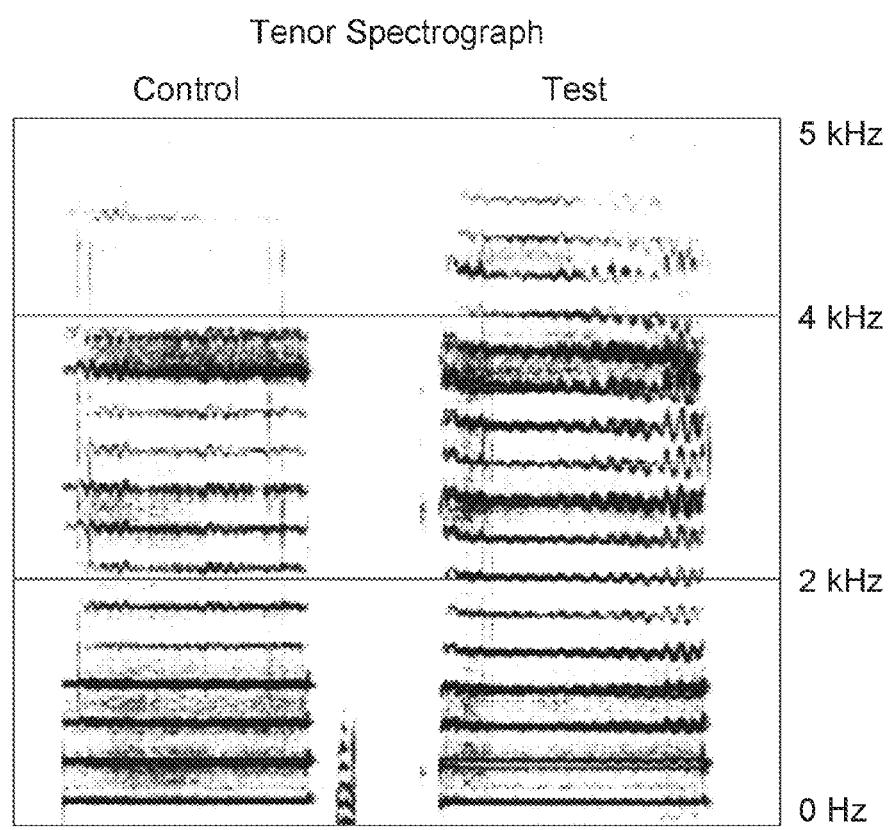
FIG. 19 shows a spectrograph comparing the intensity between control and test trials for a tenor voice.
Figure 20:
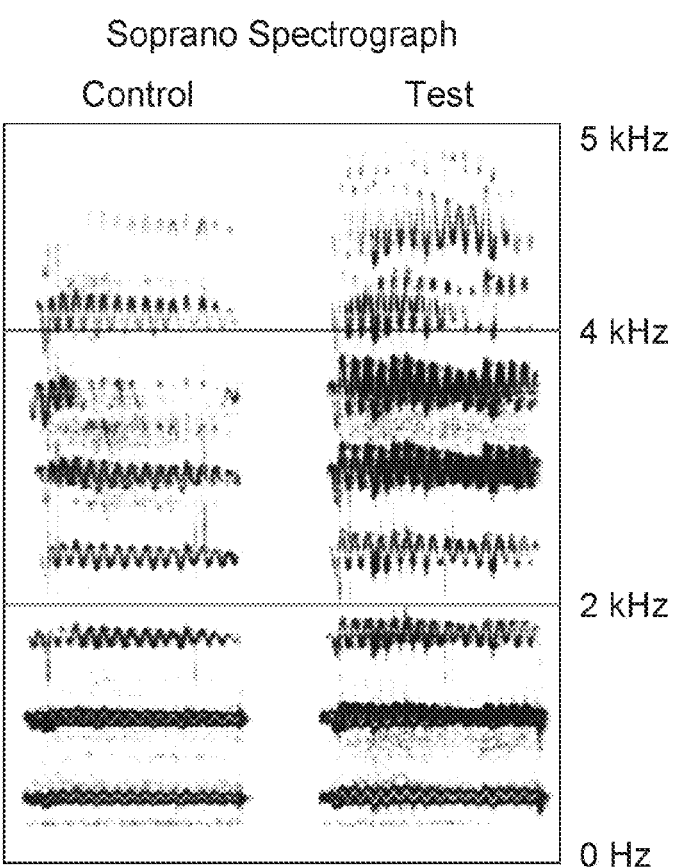
FIG. 20 shows a spectrograph comparing the intensity between control and test trials for a soprano voice.

As shown in FIGS. 19 and 20, spectrographic comparisons of control and test trials of a tenor and a soprano revealed a consistent increase in intensity of the "singer's formant frequency" (between 2000 Hz and 4000 Hz inclusive) as well as all harmonics above 4000 Hz. The higher harmonics increased in intensity, since the panel of voice experts generally perceived the tones heard in the test trial recordings to be "warmer" or "rounder," not brighter as one might expect with an increase in higher harmonic intensity.

Figure 21:
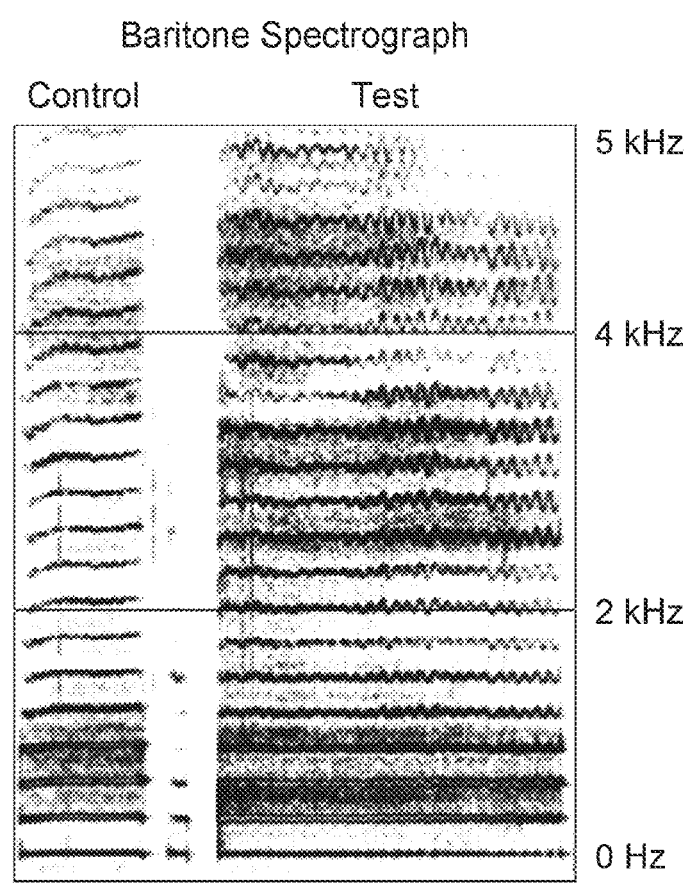
FIG. 21 shows a spectrograph comparing the intensity between control and test trials for a baritone voice.
Figure 22:
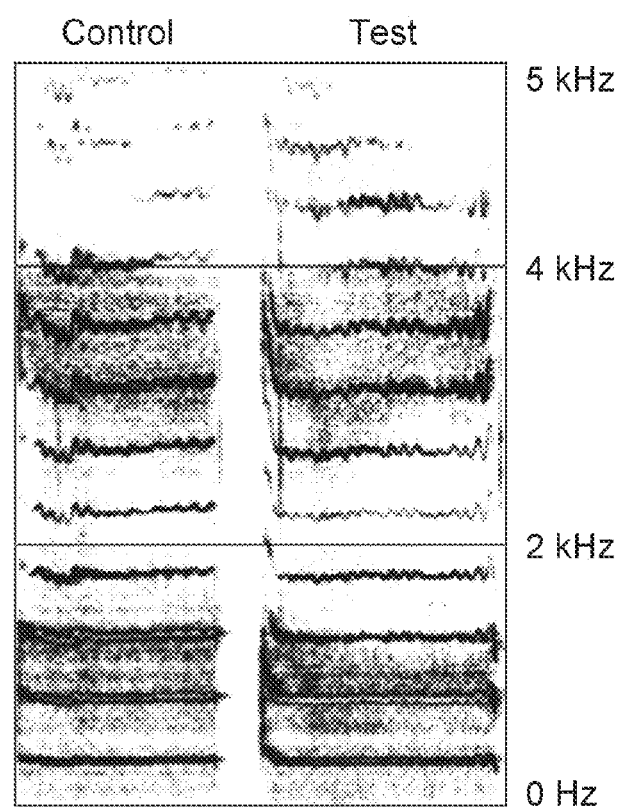
FIG. 22 shows a spectrograph comparing the intensity between control and test trials for a mezzo-soprano voice.

Vibrato oscillations were slow, inconsistent, or completely absent from some of the sung tones recorded in the control trials. During the test trial, especially among those participants who greatly increased their EMG output by successfully lowering the larynx, there was an increase in occurrence of vibrato. The data are shown from a baritone singer and a mezzo-soprano singer in FIGS. 21 and 22. Upon successfully lowering the larynx and increasing EMG biofeedback, participants whose vibratos were slow in the control trial generally experienced an increase in vibrato speed. When participants successfully increased EMG biofeedback and lowered the larynx, the resultant tone sounded louder, more resonant and vibrant.

Surface electrode EMG biofeedback was a reliable indicator of the activity of the laryngeal depressor muscles ST/SH. EMG biofeedback taught both male and female singers to activate the laryngeal depressor muscles and to maintain a lower laryngeal posture while singing. A lowered laryngeal posture improved the perceived quality of sung tone, intensified the "singer's formant frequency," increased the overall amplitude of the tone, and encouraged vibrato oscillations.

In one embodiment, voice students in voice labs practice while connected to a portable EMG biofeedback device (Noraxon Inc.). Singer-specific software applications are described below and are accessible directly or downloaded (e.g., iTunes). The device can connect wirelessly to a personal external remote device using, e.g., a bluetooth connection.

There are other embodiments for EMG in training singers in addition to teaching the lower laryngeal position. In one embodiment, EMG is used to correct unwanted shoulder, jaw, or neck tension. Singers receive an audible cue when the offending muscle is tensed.

One embodiment is a software program that translates real-time electromyographic data from laryngeal depressor muscles of a vocalist to a sensory readout, and provides instructions to at least double the EMG data. The program may include instructions for integrating EMG data into a remote external device such as a personal computer, a mobile phone, a tablet computer device, an MP3 player (e.g., iPhone®, iPod Touch®, iPad®, etc.).

The software components for voice training include an EMG laryngeal movement meter, a vibrometer, a focus meter, and an optional tension reliever. The following non-limiting examples show specific software uses and applications.

The EMG laryngeal movement meter provides data that constitute visual biofeedback regarding laryngeal movement. The EMG data are displayed as a bar graph, where an increase in microvolts from the EMG device yields a taller bar graph. Because the average participant emitted about 6 microvolts while doing nothing, a calibrate button sets the at-rest EMG output of the relaxed muscle to zero, so that the bar will have a full range of motion from flat-line, while at rest, to varying degrees of tension shown in a taller bar. A drawing of a larynx displayed to the left of the EMG bar graph moves up and down a few cm in relation to the movement of the bar graph. The larynx drawing descends as the EMG bar graph ascends, and vice versa.

For the inventive method, the following steps were used to achieve lower laryngeal position, resulting in an improved tone. The training method should initially be implemented under the supervision of a voice teacher, speech pathologist, or other voice specialist until the user fully understands the exercises and the meaning of the EMG biofeedback.

The user is recommended to practice the method in the order of the steps listed below, for no more than 30 minutes a day total during the first week. Because this method involves tensing muscles (ST/SH) that are typically not very active in normal speech or casual singing, muscle soreness in the perilaryngeal region just above the sternum may present following training. As in any athletic training, some muscle soreness is expected and normal. The classical vocalist or singer is a vocal athlete who is expected to vocalize louder, longer, higher and lower than the common voice.

Figure 2:
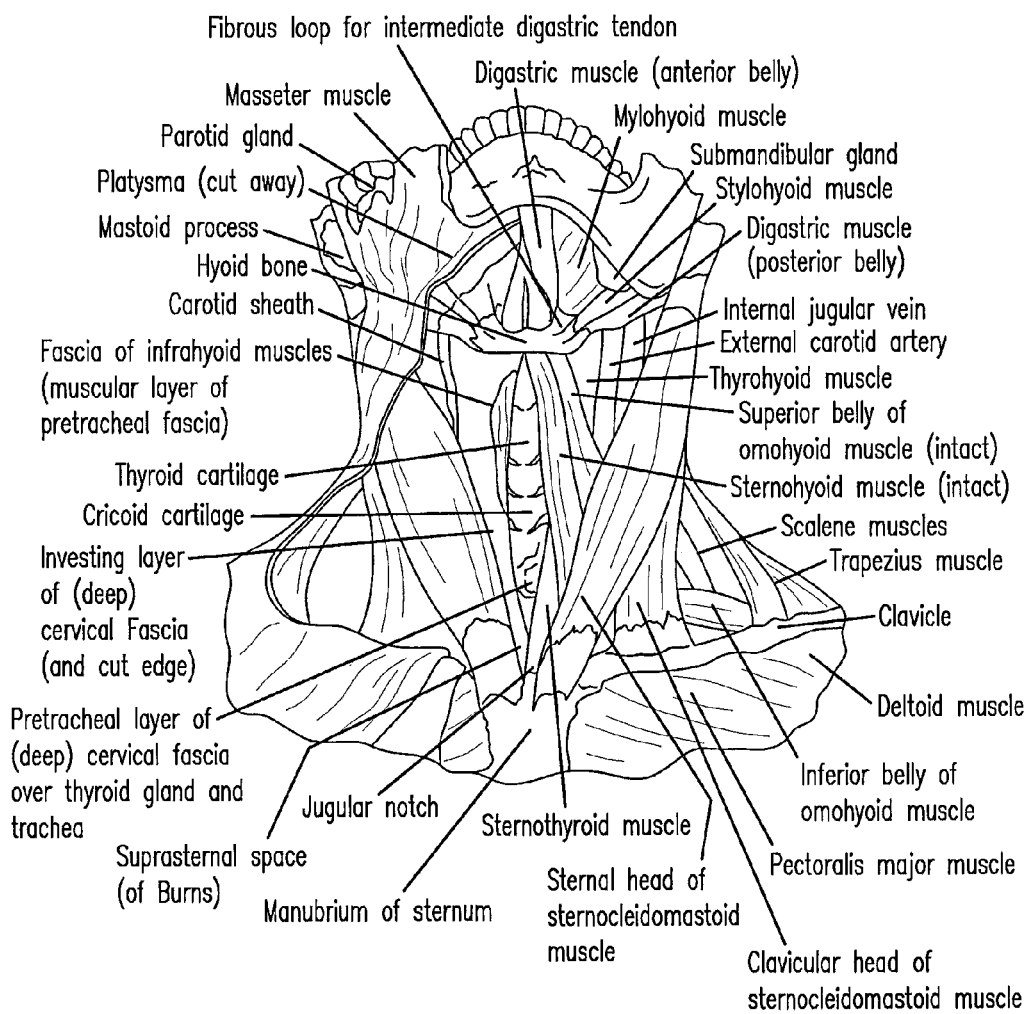
FIG. 2 shows an anterior view of muscles of the neck.

The following instrumentation is used in the exercises. Surface electromyography (sEMG) is a technique for measuring the timing and amplitude of muscle contraction using electrodes that are placed on the skin surface. This technique can be used to provide visual biofeedback on a computer screen during voice training, displaying a signal representing the activity of the laryngeal depressor muscles sternothyroid/sternohyoid (ST/SH). EMG recordings are made bilaterally from the ST and SH muscles of the neck using four bipolar surface electrodes (FIG. 1 1A, 1B, 1C, 1D) oriented parallel to the direction of the muscle fibers (FIG. 2). The fifth electrode (1E) is attached to in the area of the pectoralis muscle.

Step 1 of the method is a check of the laryngeal sEMG signal to ensure that the electrodes are correctly displaying activity of the laryngeal depressor musculature (ST/SH). This step also trains the singer how to recognize the physical sensations and EMG biofeedback associated with downward movement of the larynx.

Figure 15:
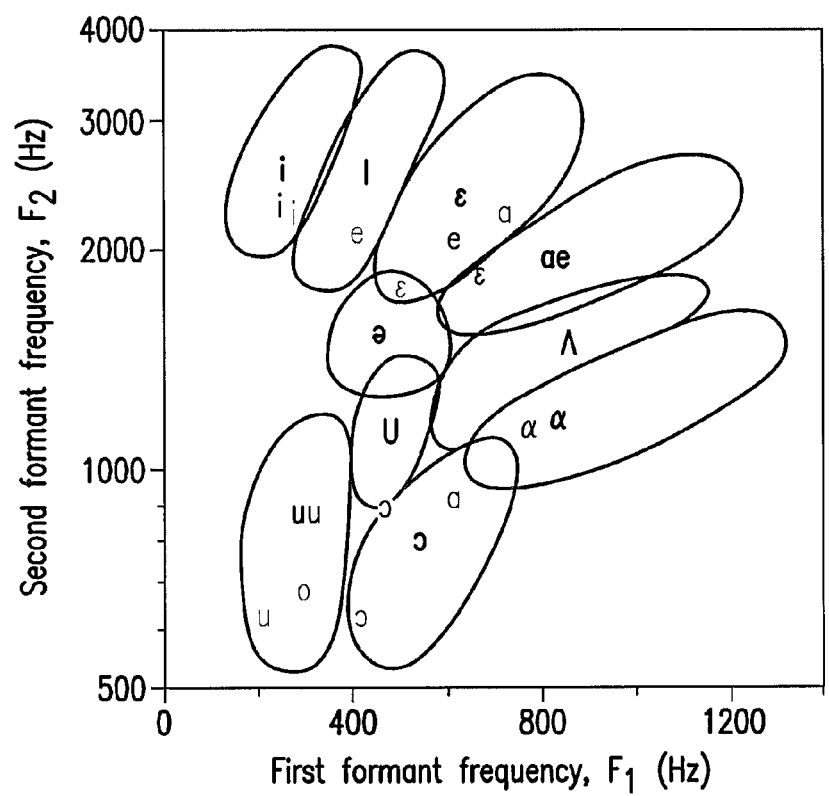
FIG. 15 shows the second formant frequencies of vowels. Different color vowels represent various researchers' results when plotting these formants.

Once the electrodes have been positioned bilaterally, anterior to the thyroid cartilage, just below the superior protuberance of the laryngeal prominence ("Adam's Apple") (FIG. 15) and connected, the clinician instructs the vocalist to perform some tasks that are expected to display variations in signal amplitude of the laryngeal depressor muscles.

Figure 16:
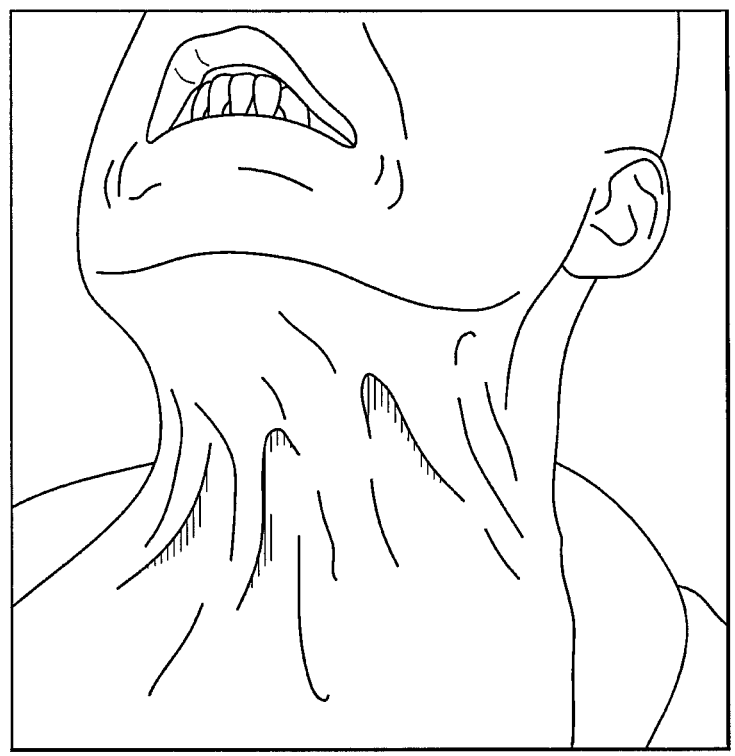
FIG. 16 shows excessive platysma tension, which would cause undue interference with EMG measurements.

Directing the user to swallow should show some EMG activity as the larynx rises and descends. Then to confirm signal quality and begin training, direct the vocalist to "gently yawn" three or four times. When one yawns, the larynx descends, and the laryngeal sEMG signal from ST/SH should deflect in a positive direction. As the yawn ends, the signal should return to baseline. Larger jaw opening and facial tension may present greater changes in signal amplitude because of interference from nearby muscles, so care should be taken to minimize such superfluous perilaryngeal tension. For example, FIG. 16 shows a man displaying undesirable platysma tension, which will cause EMG interference when trying to measure ST/SH activity.

If electrode placement is not sufficiently anterior to the thyroid cartilage, one runs the risk of interference from the sternocleidomastoid muscles located on either side of the larynx. Care must also be taken that the platysma muscle is not tensed during training. The platysma is a superficial sheet of muscles that covers the neck and inserts at the jaw. It is flexed when one grimaces or frowns. When tensed, there is a characteristic flaring of the neck and wrinkling of the skin of the neck along the vertical fibers of the platysma (FIG. 16). Therefore, make sure that the participant relaxes the facial muscles and neck while performing the yawn exercise.

Step 2 of the method involves a baseline measurement of sEMG amplitude at rest and during regular speech and vocalization. For this task, the vocalist should relax the muscles of the face and neck, and simply breathe normally for about 10 seconds. For the first 10 seconds, the user's goal is to relax the face, mouth and throat muscles to establish the baseline EMG output at rest. After that, the user should speak at a normal intensity level and watch the EMG biofeedback. The EMG will likely show very little change during speech from the at-rest EMG levels, assuming the vocalist is not shouting.

Some vocalists have difficulty achieving relaxation in this phase, and this can become a first training goal. If the signal amplitude is very high or very erratic, then this may suggest poor electrode contact and the apparatus and correct set-up should be verified.

Step 3 of the method establishes a baseline for vocalizing or singing a sustained pitch on various vowels. The vocalist should sing a sustained pitch that is slightly higher than the comfortable speaking range on an /a/ vowel for at least three seconds; the level of EMG output from ST/SH is noted. The step is repeated at least two more times, using the same pitch on various vowels. This determined if there are any differences from vowel to vowel.

Step 4 of the method practices lowering the larynx while vocalizing or singing and observing the effects on the tone. For step 4, step 3 is repeated but the participant is instructed to lower the larynx, similar to the yawn exercise in step 1. while watching the computer screen for EMG biofeedback confirmation that ST/SH were successfully activated. The EMG signal should deflect in a positive direction above levels measured in step 3.

The teacher, other specialist, vocalist, or singer is instructed to observe if/how the tone quality, volume, vibrato oscillations or lack thereof, vowel clarity, and resonance properties of the voice were affected by the accomplishment of the lower laryngeal posture and increased EMG output on ST/SH during phonation. Use the record and playback functions of the BioGraph Infinity software facilitates side-by-side comparisons of the tone quality in steps 3 and 4.

Because the base of the tongue is attached to the top of the larynx at the hyoid bone, the downward movement of the larynx caused by the activation of ST/SH will draw the base of the tongue downward to some degree and may alter the vowel sound. The vocalist or singer may need to adjust the tongue position slightly in order to find vowel clarity in this new comparatively lower laryngeal posture.

Step 5 of the method involves vocalizing or singing while practicing lowering of the larynx. The vocalist or singer is instructed to vocalize or sing a song while lowering the larynx, as in step 4, watching the EMG biofeedback for confirmation that the laryngeal depressors are active and the larynx is in a lower position. If the vocalist or singer has difficulty accomplishing the lower laryngeal posture while articulating words, the vocalist should attempt to sing the melody on only the vowel sounds of the words in a phrase. Once the vocalist has accomplished singing the melody on the vowels in a phrase of the song while maintaining a lower laryngeal position and increased EMG output from ST/SH (compared to the at-rest baselines established in steps 2 and 3, the vocalist can then try again to sing the passage on actual words.

The teacher, specialist, vocalist, or singer uses or is instructed to use the record and playback functions of the BioGraph Infinity software to observe the interaction of EMG data relative to the sound and tone quality. There typically is a strong correlation between increased EMG biofeedback from ST/SH to the amplitude of the sound produced, the presence and consistency of vibrato oscillations, and the resonance of the voice.

In analysis of the data that are collected, there are no normal results for sEMG amplitude during phonation; it is not possible to refer to "norms" for EMG amplitude of the extrinsic laryngeal muscles measured during vocalizing and/or singing. The signal that is collected from electrodes may include composite information about several muscles (ST/SH, omohyoid, sternocleidomastoid, platysma). Unless the user is absolutely certain that the electrodes were placed in precisely the same location across different sessions, one cannot be certain that the EMG signal amplitude range will be the same. Any tissue between the surface of the skin and the underlying muscles will dampen the signal. Because different individuals have different degrees of neck tissue, fat, etc., EMG signal amplitudes vary widely across individuals.

For example, the average participant in one study nearly doubled the EMG output between the control trial singing task (step 3) and the test Trial (Step 4 in the method).

To determine if a vocalist is improving using sEMG biofeedback, recorded or live sung examples are analyzed using sound analysis software. Such software is commercially available, e.g., Vocevista, Sing & See, or RavenLite 1.0. Surface EMG captures and represents only one aspect of singing, namely the activity of the muscles around the larynx. Consequently, one cannot be certain, based on the sEMG signal alone, whether the vocalist's laryngeal position has changed and/or their tone quality has improved.

Tone quality is a subjective measure. For a more clinical measure of the scientifically quantifiable components of the sound, which include vibrato oscillation rates, pitch excursion, harmonic intensity, "singer's formant cluster," etc. This must be confirmed by listening to the audio recordings for aural confirmation and comparisons.

Vocalists benefit directly from this training method with improvements in their perceived quality of sung tone. These include factors such as increased vocal range, increased resonance and amplitude of the sung tone, increased intensity of the "singer's formant cluster," and increased presence and consistency of vibrato oscillations.

In one embodiment, the vocalist uses the method with a commercially available software suite with documentation to support the techniques necessary for using surface electromyography for training to achieve and maintain the lower laryngeal position while singing.

Functions that are based on sound input from the computer or mobile device's onboard microphone include the following.

Use of vibrometer for pitch tracking. Spectrographic data can be collected an external microphone, or a computer's onboard microphone. The data are calculated using the short-time Fourier transform. This spectrographic data can be used to build a graphic display of the singer's sung pitch; i.e., the fundamental frequency, measured in Hz. When a person sings the vibrometer display would show a line that represents the sung frequency in real time. The length of line would represent 3-10 seconds of sampled audio input.

Figure 5:
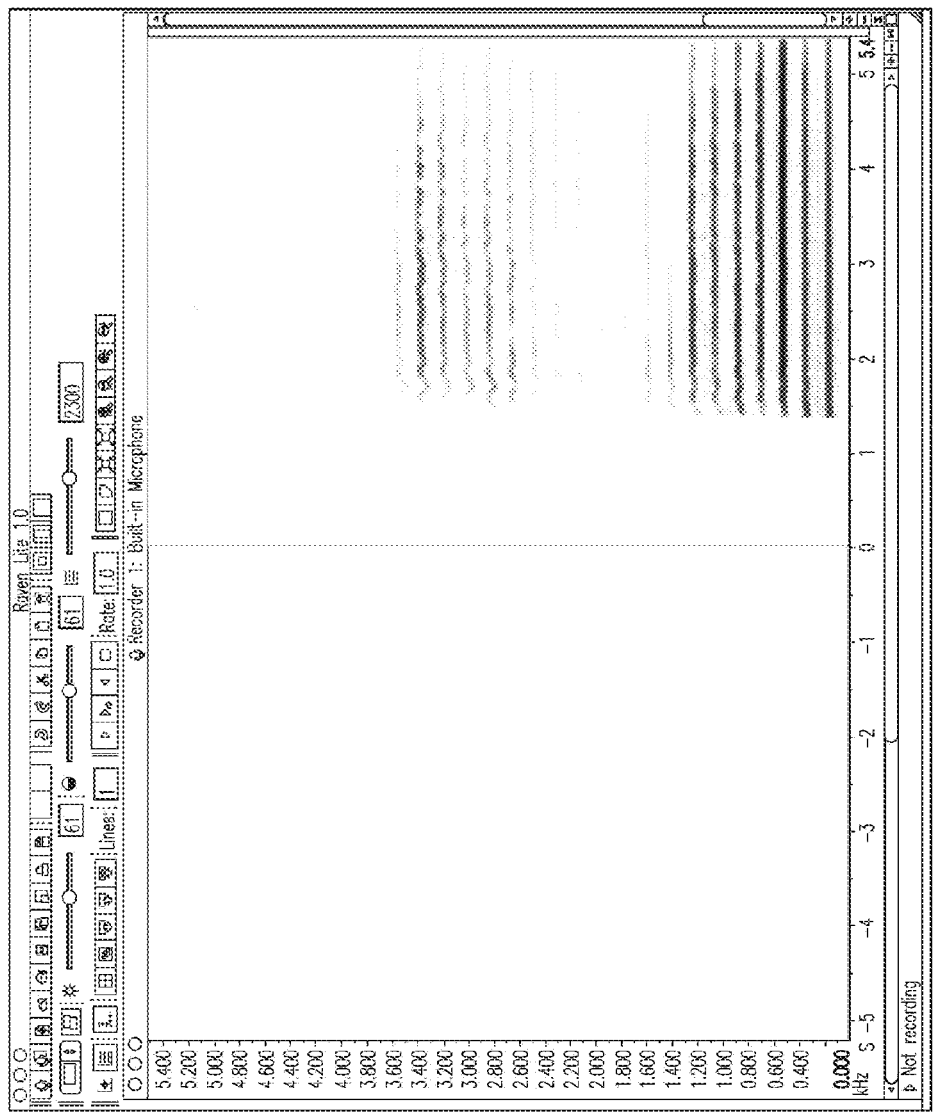
FIG. 5 shows a spectrograph of a straight tone with very little frequency deviation that would register as a straight line on a vibrometer.

If the audio input registers as a steady sustained frequency, the vibrometer would display a straight horizontal line. Spectrograph of a straight tone with very little frequency deviation that would register as a straight line on the vibrometer are shown in FIG. 5. The frequencies that make up the 12-note musical scale used in western music is based on a logarithmic formula $$p = 69 + 12 \times \log_2 \frac{f}{440 \text{ Hz}}$$

Figure 6:
FIG. 6 shows the frequencies that form the basis of the 12-note musical scale and the norms of the software.

FIG. 6 displays a chart of the frequencies that make up the 12-note musical scale upon which the norms will be based in the software. Based on the above-described formula, or the chart of the frequencies of the musical scale, the software will recognize what pitch (frequency) is being sung. The sung pitch (frequency) is displayed with the letter-name nomenclature in the chart (A0-C8) and/or with an animated graphic of a piano keyboard that moves up and down relative to the frequency so that the vibrometer's horizontal line falls over the keyboard note that most closely matches the frequency being sung.

The vibrometer provides the singer with visual feedback and qualitative analysis of the vibrato component of sung tone. The vibrometer displays sung pitch/frequency as a 4 inch line at a 1 second sample rate, where 3 inches of line represents one second of singing time. When no pitch/frequency is detected, the line vanishes. To the left of the vibrometer line, the pitch being sung is displayed, either as a treble or bass clef with a whole note on the appropriate line and/or with the letter name. If the pitch being sung is straight-tone and in tune for a one-second sample, the vibrometer line turns green. If the frequency oscillates in an irregular pattern, the line turns yellow, then red. If there are between 5-7 oscillations of frequency per second that do not exceed a half step in range, the line turns green. If vibrato oscillation rate becomes too fast, too slow, or exceeds the half-step pitch range of motion, the line turns yellow, then red. The vibrometer line does not move up and down on the screen as the pitch changes, but rather it maintains one position on the page. Sharp and flat singing are indicated with the words "sharp" or "flat."

The vibrometer is used for vibrato tracking. Vibrato is a rhythmic and symmetrical pitch (frequency) oscillation in the sustained sung tone. Based on the same spectrographic data used to calculate the fundamental frequency in the pitch tracking function of the vibrometer, the software generates a graphic display for vibrato oscillations. The vibrometer displays a green wavy line if the sung frequency registers as having a regular frequency oscillation rate of $5-6^{1/2}$ cycles per second and a pitch excursion of no more than two half steps on the musical scale from the highest frequency in the oscillation to the lowest frequency. The keyboard animation and note name display would freeze at the pitch level on the musical scale around which the frequency is oscillating. For example, if one sings with vibrato and the frequency oscillates between 241.63 and 281.63 Hz, the pitch C4 (261.63 Hz) would display on the Vibrometer.

Figure 7:
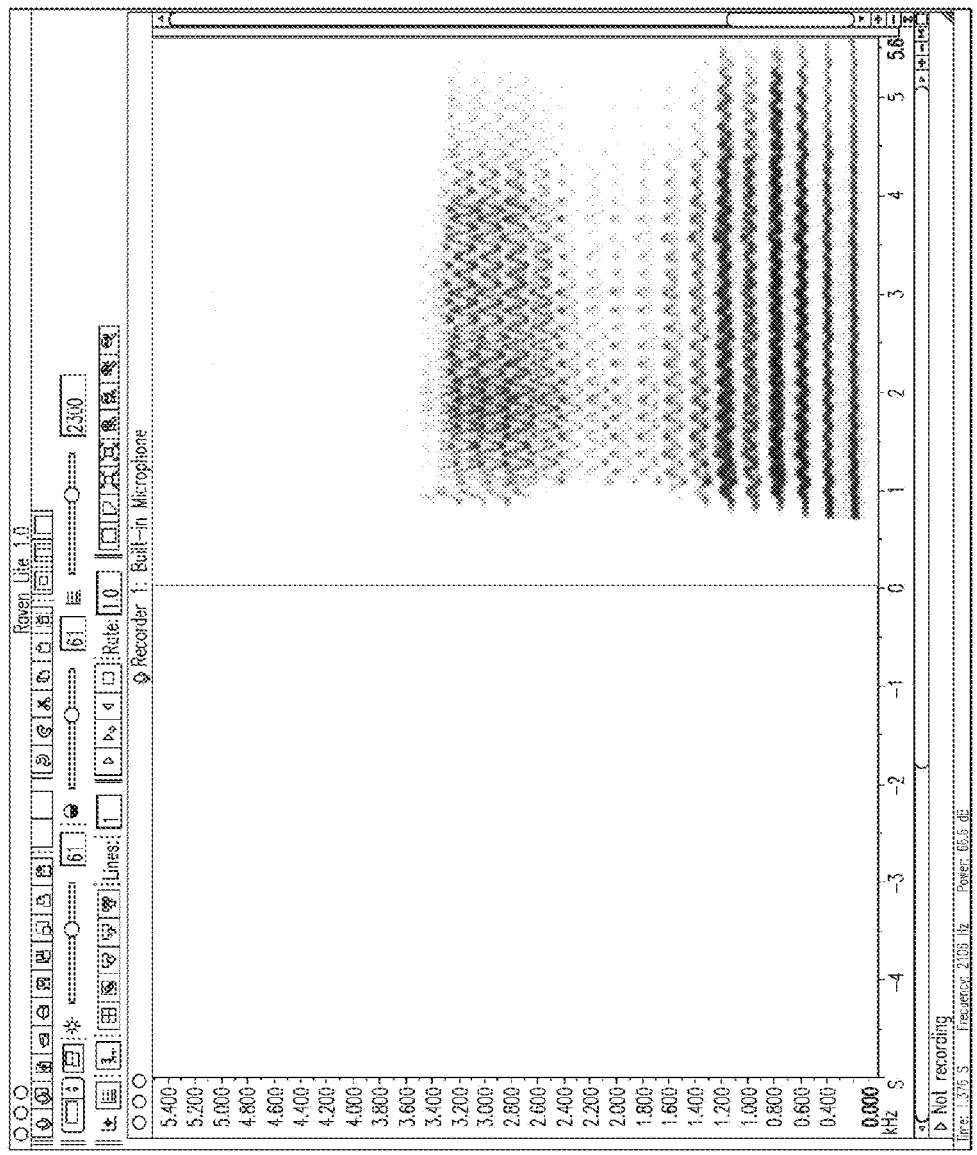
FIG. 7 shows a spectrograph of a tenor singing with a vibrato rate of $5^{1/2}$ oscillations per second and a pitch excursion of no more than two half steps on the musical scale from the highest frequency to the lowest, which would display as a wavy line on the vibrometer.

Spectrograph of a tenor singing with a vibrato rate of $5^{1/2}$ oscillations per second and a pitch excursion of no more than two half steps on the musical scale from the highest frequency to the lowest, which would display as a green wavy line on the "Vibrometer." FIG. 7.

Figure 8:
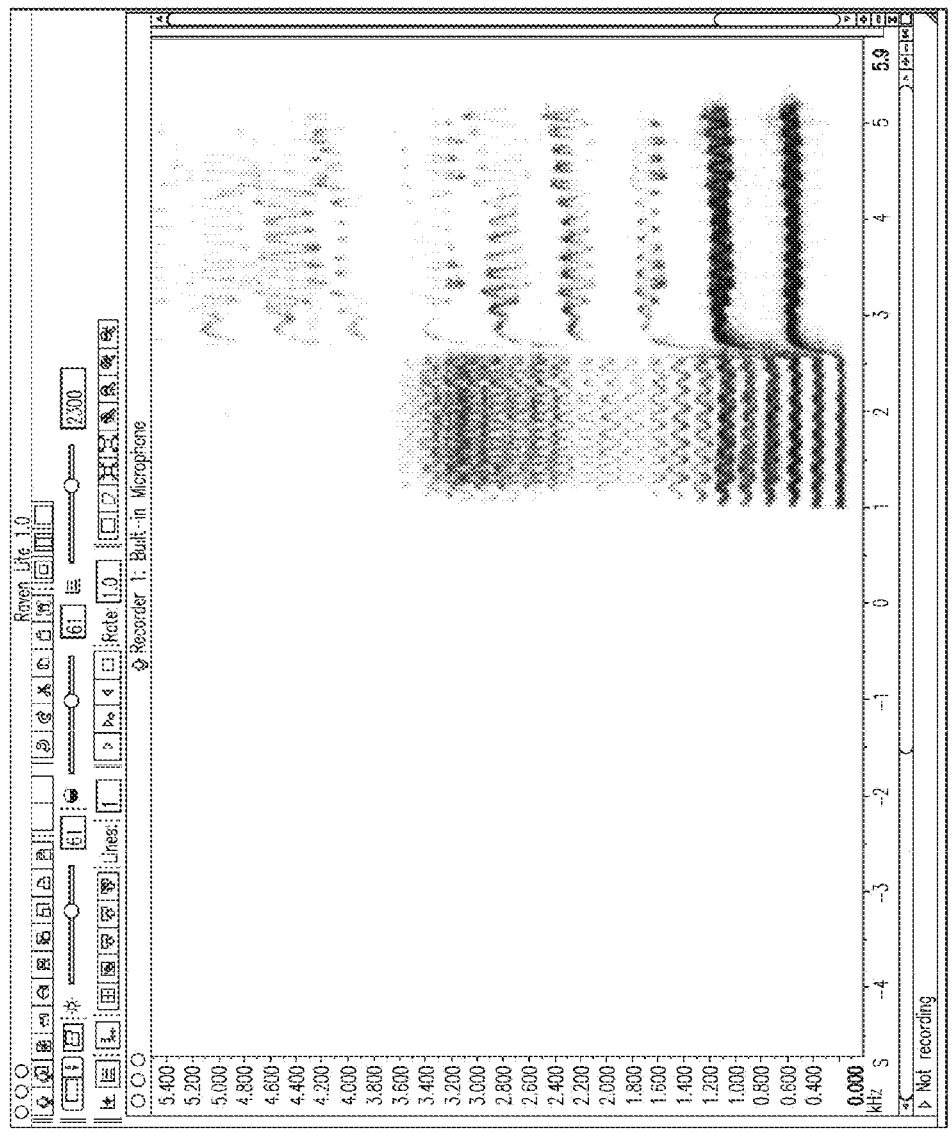
FIG. 8 shows a spectrograph of a male singing a note in his speaking range, then sliding up to a soprano range with a consistent vibrato rate of ca. $5^{1/2}$ oscillations per second and a pitch excursion of no more than 2 half steps, which would display in the vibrometer as one wavy green line based on the lines displayed in this spectrograph between 1,000 and 2,000 Hz.

For the vibrometer line display to move up and down relative to the sung frequency in a consistent scale, regardless of whether a relatively low note or a relatively high note is vocalized or sung, it should be based on the movement of the harmonics between 1,000 and 2,000 Hz in the sound spectrum. In the spectrograph shown in FIG. 8, the vibrometer line display would be a single wavy line which is one or a composite of the harmonics between 1,000 and 2,000 Hz.

A spectrograph of a man singing a note in his speaking range, then sliding up to a soprano range with a consistent vibrato rate of ca. $5^{1/2}$ oscillations per second and a pitch excursion of no more than 2 half steps, would display in the vibrometer as one wavy green line based on the lines displayed in the FIG. 8 spectrograph between 1,000 and 2,000 Hz If the vibrato oscillations on a sustained sung pitch are irregular in frequency excursion and/or oscillation rate, or if they exceed the norms mentioned earlier (5-$6^{1/2}$ oscillations per second, no more than 2 half steps in pitch excursion) the vibrometer line display will change colors to yellow after 1 second, then red after 2 seconds.

Figure 9:
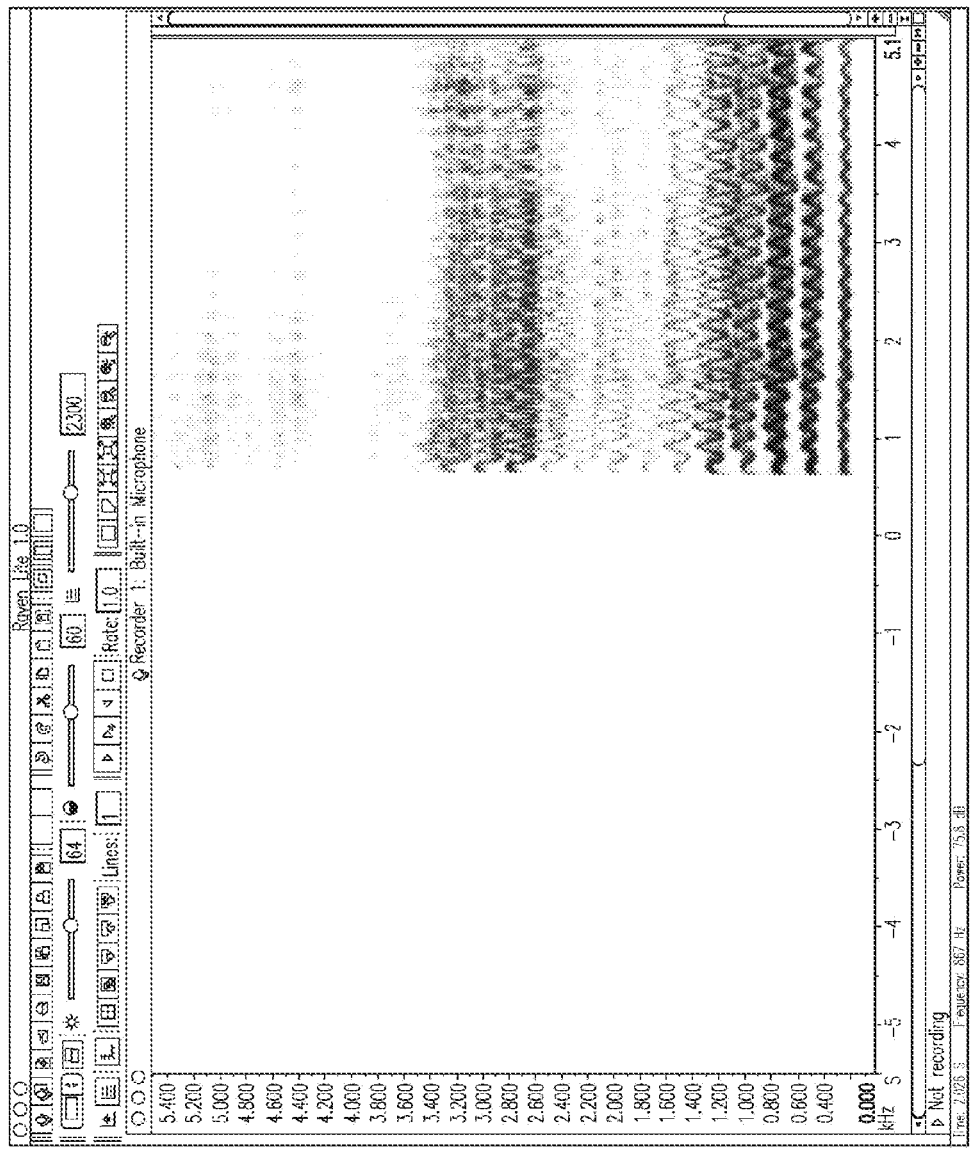
FIG. 9 shows a spectrograph of a male singing with a vibrato rate of $4^{1/2}$ oscillations per second and a pitch excursion of more than two half steps on the musical scale, which would show as a red wavy line in the vibrometer and would display the word "wobble."

FIG. 9 is a spectrograph of a man singing with a vibrato rate of $4^{1/2}$ oscillations per second and a pitch excursion of more than 2 half steps on the musical scale, which would show as a red wavy line in the vibrometer and would display the word "wobble."

Figure 10:
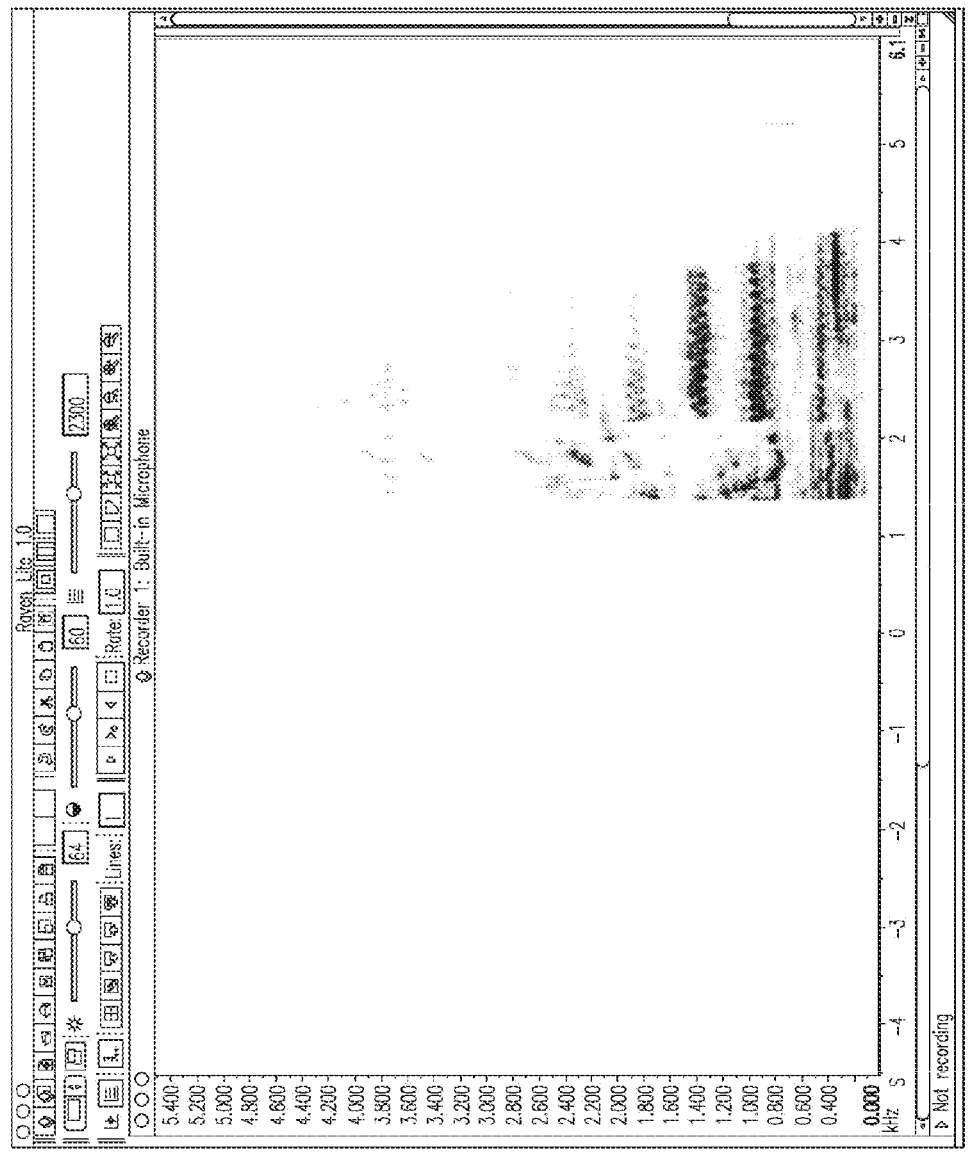
FIG. 10 shows a spectrograph of a soprano singing with a vibrato rate of $7^{1/2}$ oscillations per second and a pitch excursion of no more than 2 half steps from highest to lowest frequencies, which would display as a red wavy line in the vibrometer and display the word "bleat."

FIG. 10 is a spectrograph of a soprano singing with a vibrato rate of $7^{1/2}$ oscillations per second and a pitch excursion of no more than 2 half steps from highest to lowest frequencies, which would display as a red wavy line in the vibrometer and display the word "bleat." If the pitch oscillation rate exceeds $6^{1/2}$ cycles per second and the pitch excursion exceeds the 2 half-step norm, the word "flutter" will appear in the vibrometer.

The vibrometer function of the software may be recorded and played back along with the audio. This use enables the vocalist to review the data and observe the relationship between the vibrometer biofeedback and the recorded audio.

The focus meter provides the vocalist or singer with visual feedback and qualitative analysis of the harmonic spectrum of the vocalized or sung tone and its perceived quality, e.g., breathy/unfocused to focused/resonant. A clean voice or tone, i.e., not breathy or noisy, displays on a spectrograph that has been calibrated for the parameters of human vocalization as a set of neat, parallel lines with nothing in between the harmonics (i.e., empty space). A noisy voice or tone shows the normal harmonics in parallel lines, but there is a lot between the lines, especially among the first five harmonics, which are further apart in frequency. A visual informs the singer when the voice or tone is breathy/noisy. A focused tone has increased intensity among the cluster of harmonics between 2,000 Hz and 4,000 Hz inclusive. A visual informs the singer when the voice or tone is focused and resonant. In one embodiment the focus meter is a spectrographic display. In one embodiment the focus meter is not a spectrographic display. In one embodiment, a profile of a face in the bottom of the screen, e.g., left side, with a mouth open in the singing posture is a focus meter visual. Light would emanate from the mouth when the singer sings. If the tone is unfocused/noisy/breathy based on the spectrographic data, the light would be dim and spread out in a triangular pattern from the mouth opening, where the tip of the triangle would be inside the mouth, out of view, and the wide base of the light triangle on the right margin of the screen. When the tone has little or no noise between harmonics 1-5, the light triangle begins to focus into a beam/rectangle of light. When the harmonics in the 2,000 Hz-4,000 Hz range increase in their relative intensity to the fundamental frequency, the light becomes more brilliant and intense. For example, an intense light may start a fire on the right side of the screen.

The focus meter is used for resonance tracking. When the spectrograph is calibrated to the parameters of the human voice, a clear and resonant voice will show as a series of lines with little if any noise between harmonics. If the voice is noisy and/or breathy, white noise appears between the harmonics. In a focused and resonant singing voice there tends to be greater intensity among the harmonics between 2,000 and 4,000 Hz (the singer's formant cluster). The vocalist's or singer's formant cluster is generally more intense in male singers and women singing with heavy thyroarytendoid activity, commonly referred to as "betters". Based on these data, the focus meter will display a face in profile with the mouth open in singing posture. If the spectrograph indicates a noisy/breathy tone, scattered and diffuse light would emit from the mouth in the graphic. If the harmonic spectrum is clean, the light emitting from the mouth would focus down to a beam of light. If the vocalist's or singer's formant cluster of harmonics (2,000-4,000 Hz) is intense, the beam of light would grow brighter and more intense.

Figure 11:
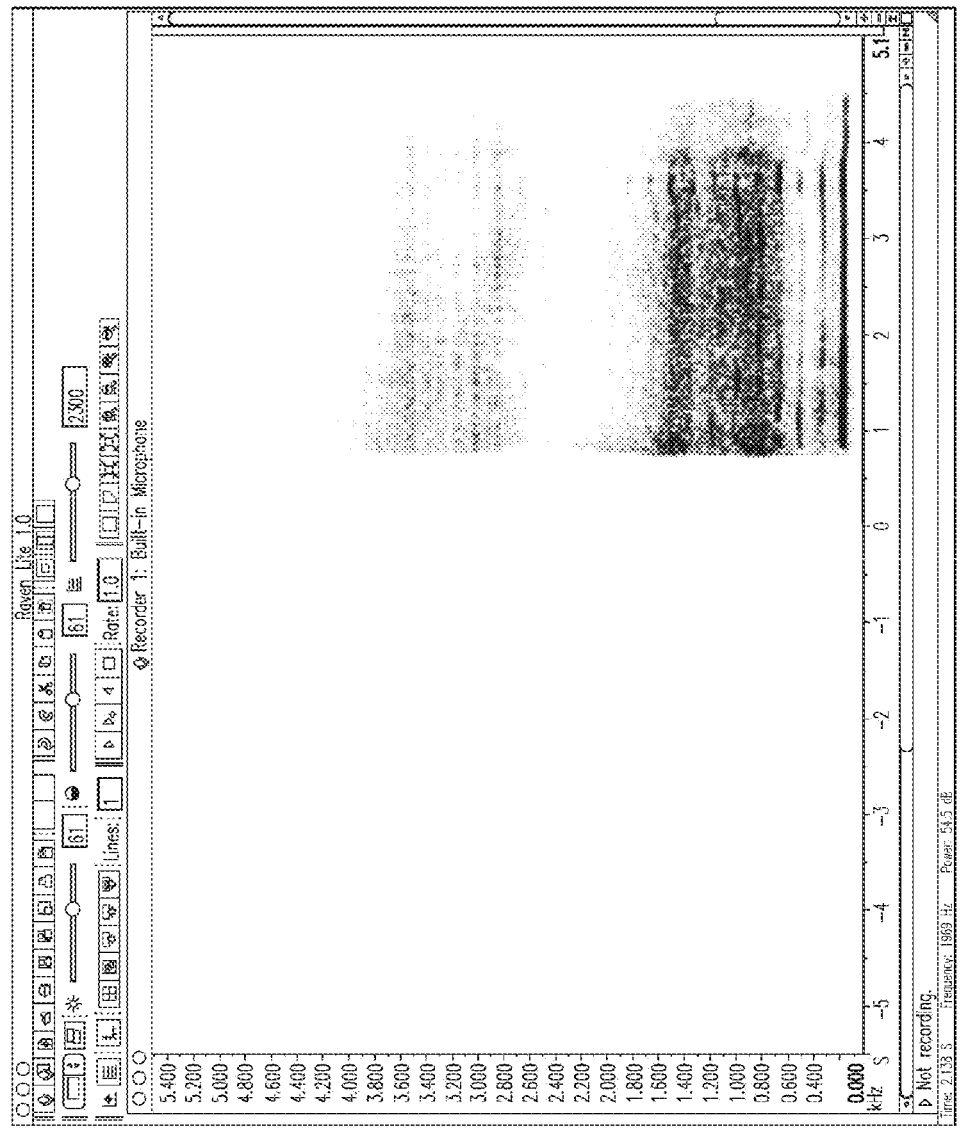
FIG. 11 shows a spectrograph of a noisy, breathy voice with white noise between harmonics, which would yield a diffuse and scattered light graphic emitting from the profile face in the focus meter.
Figure 12:
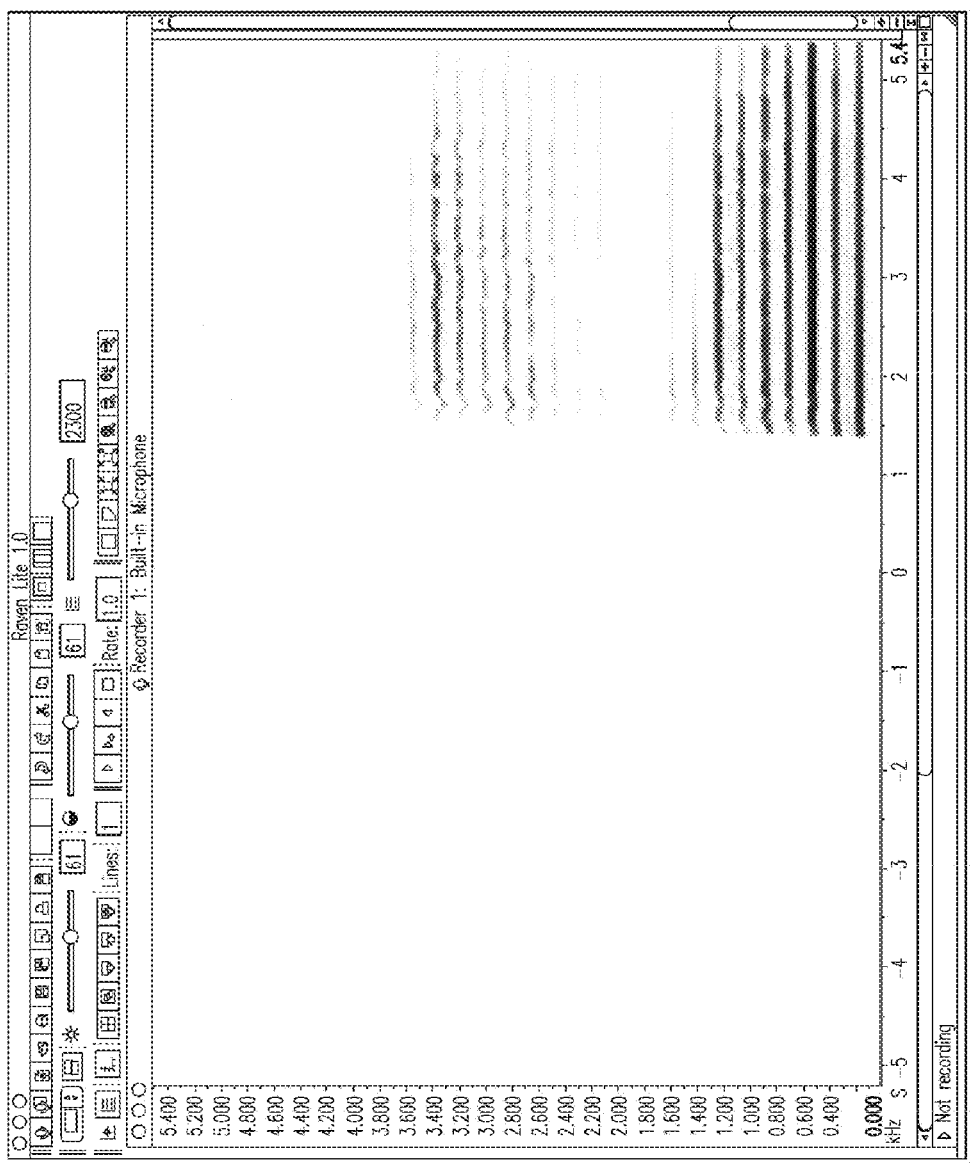
FIG. 12 shows a spectrograph of a clear voice with very little noise between harmonics, but not a lot of intensity in the singer's formant cluster of harmonics between 2,000 and 4,000 Hz, which would yield a beam of light emitting from the profile face in the focus meter.
Figure 13:
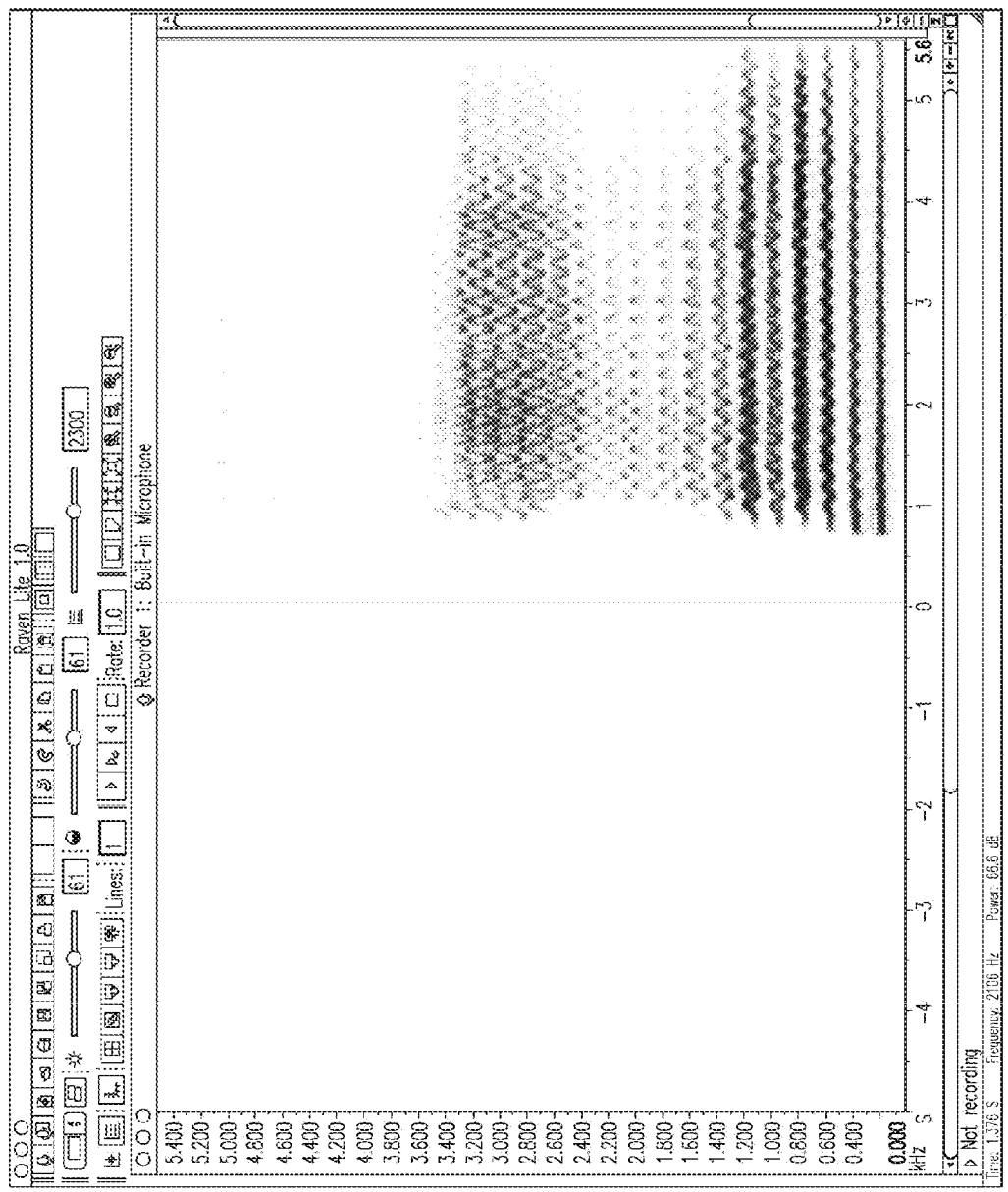
FIG. 13 shows a spectrograph of a male singing with a clear tone and intensity among the singer's formant cluster of harmonics between 2,000 and 4,000 Hz, which would yield an intense beam of light emitting from the profile face in the focus meter

A spectrograph of a noisy, breathy voice with white noise between harmonics would yield a diffuse and scattered light graphic emitting from the profile face in the focus meter, as shown in FIG. 11. A spectrograph of a clear voice with very little noise between harmonics, but no intensity in the singer's formant cluster of harmonics between 2,000 and 4,000 Hz, would yield a beam of light emitting from the profile face in the focus Meter, as shown in FIG. 12. A spectrograph of a man singing with a clear tone, defined as no white noise between harmonics, and intensity among the singer's formant cluster of harmonics between 2,000 and 4,000 Hz, would yield an intense beam of light emitting from the profile face in the focus meter, as shown in FIG. 13.

For vowel tracking, the software will display the International Phonetic Alphabet (IPA) symbol for the vowel being sung, or spoken, based on the spectrographic data coming from the microphone. The vowels can be determined from the spectrographic data because each vowel has signature formant frequencies, which are peaks of intensity in the harmonic spectrum associated with each vowel. By tracking the first two formant frequencies of the primary vowels, we can display the appropriate IPA symbol based on the charts shown in FIG. 14.

Figure 14:
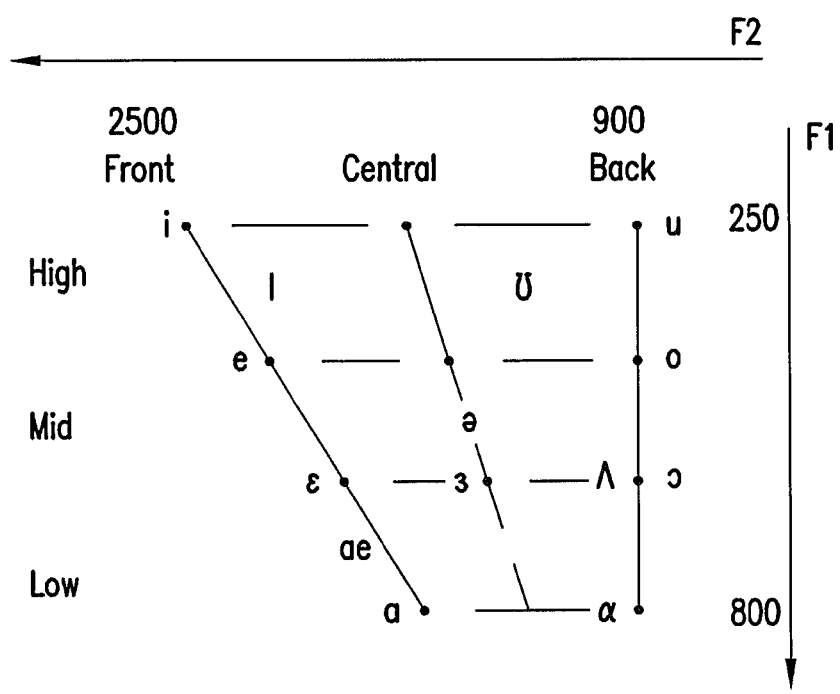
FIG. 14 shows the formant frequencies of vowels. Front, Central and Back refer to the position of the tongue in the formation of the vowel. High, Mid and Low also refer to the tongue position in the formation of the vowel. Each dot on the vertical scale between 250 Hz and 800 Hz is equal to about 183.3 Hz.

Formant frequencies of vowels are as follows and as shown in FIG. 14. Front, Central and Back refer to the position of the tongue in the formation of the vowel. High, mid and low also refer to the tongue position in the formation of the vowel. Each dot on the vertical scale between 250 Hz and 800 Hz is equal to about 183.3 Hz. Repeated vowels represent various researchers' results when plotting these formants, shown in FIG. 15.

Based on the fundamental frequency being sung, the program can recommend to the singer which vowel might be optimal for resonance purposes. Loudest resonance occurs when the vowel formants ($F_1$ or $F_2$) are tuned to match the fundamental frequency of the sung pitch, or one of its harmonics. Based on the spectrographic data and the programmed database of standard vowel formants, the software recommend a particular vowel to achieve louder resonance.

In one embodiment, the EMG laryngeal movement meter, the vibrometer, and the focus meter are used together at the same time.

In one embodiment, when the vocalist or singer achieves a green vibrometer and a brilliant focus meter at the same time, a visual encouragement/confirmation (e.g., lightening bolts zapping between the meters) occurs. If the vocalist or singer has a lower larynx based on the EMG bar graph, green vibrometer, and brilliant focus meter, lightening can zap between all three visuals as encouragement and confirmation of good vocalization.

The tension reliever works from EMG data. Electrodes are placed on the skin over the muscle(s) in which excess tension is a problem, e.g., jaw muscle, shoulder muscle, neck muscle, forehead muscle, etc.). EMG measurements are displayed in a bar graph, much like the laryngeal movement meter. A calibration button, as in the laryngeal movement meter, sets the flat-line or at-rest position of the meter. An audible alarm sounds when the singer exceeds the flat-line EMG level set during calibration, alerting the singer to the unwanted tension.

In one embodiment, software includes the vibrometer and focus meter components and requires no external equipment to operate properly on iPhone®, iPad®, PC, Mac®, etc. The EMG functions are available in an upgraded/plus version of the software. In one embodiment, it also requires purchase of the EMG device for which the software was designed.

In one embodiment, an interface system contains a dynamic module that displays EMG data from laryngeal depressor muscles of a vocalist, and a user interface that enables the vocalist to determine the extent his/her muscles are altered based on his/her physiological and/or anatomical actions. The system may provide cues, encouragement, rewards, instructions, reminders, etc.

In one embodiment, surface electromyography (sEMG) input is provided from an external EMG device/software. This embodiment has utility for research in areas such as speech pathology and voice, as well as patients and practitioners (e.g., vocalists, singers, etc.). In one embodiment it is used to train singers and vocalists, e.g., teachers, orators, actors, etc. As one example, it is used as a method to train vocalization with a lower laryngeal position to improve tone quality, amplitude, and resonance. As one example, it is used to train for recognition when vibrato does or does not fall within the normal parameters of oscillation rate and pitch excursion generally denominated as "pleasant." As one example, it is used to avoid unwanted and potentially injurious hyperfunctional muscle tension. As one example, it is used to train to recognize and improve vowel clarity. As one example, it is used to train to sing in tune. As one example, it is used to assist singers locate the optimal vowel that will yield a resonant tone at the frequency/pitch level at which they are singing.

The attendant components provide at least one of the following functions.

Functions based on surface Electromyography (sEMG) input from an external EMG device which include larynx tracking, tension tracking, and sEMG recording.

Larynx Tracking: sEMG biofeedback from Sternothyroid/Sternohyoid (ST/SH) will be measured by placing electrodes bilaterally over the ST and SH muscles of the neck using bipolar Ag/AgCl surface electrodes with circular, pre-gelled contact areas of 10 mm and a fixed interelectrode distance of 20 mm oriented parallel to the direction of the muscle fibers.

The sEMG biofeedback is measured in microvolts ($\mu V$) and displayed as two bar graphs, line graphs, pie charts, or some other graphic display that shows the relative increase or decrease in $\mu V$ input in real time. If the electrode placement is not sufficiently anterior, there may be $\mu V$ interference from the sternocleidomastoid muscles. (FIG. 2).

The scale of the graphic $\mu V$ display should be adjustable between 0-10 to 0-75 $\mu V$ using a "+" or "−" button to increase or decrease the scale to the particular user's liking. Unless changed by the user, the scale of the graphic display will be 0-35 $\mu V$. Because sEMG will register $\mu V$ even when the person is not tensing their muscles, a "Calibrate" button will also be part of the software design to set the at-rest $\mu V$ input coming off ST/SH to "baseline" or "0" value on the graph.

In addition to the $\mu V$ input being displayed in a graphic form, there will be an animation of a larynx moving up and down relative to the $\mu V$ input levels. When the $\mu V$ input from ST/SH rises above the calibrated "baseline," or "0" value, the picture of the larynx will descend on the screen by the same proportions as the graphic $\mu V$ display moves along its scale. Increase in $\mu V$ results in a descending larynx animation. Decrease in $\mu V$ input results in an animation of the larynx rising to its original position.

Written, audio, or video instructions will tell the user how to calibrate the $\mu V$ display and begin laryngeal training. The initial training involves instructing the user to yawn and observe how the lowering of the larynx that naturally occurs when one yawns yields a higher $\mu V$ reading on the graphic display. The user will be instructed to do this at least three times before singing. Then they will be instructed to sing while trying to increase the $\mu V$ biofeedback by tensing the same muscles they used to yawn (ST/SH). The result of achieving the higher $\mu V$ readings on ST/SH and the simultaneous lowering of the larynx should be a better, more resonant tone, marked by an increase in the intensity of the vocalist's or singer's formant cluster of harmonics (2,000-4,000 Hz) and a more even and consistent vibrato.

Figure 3:
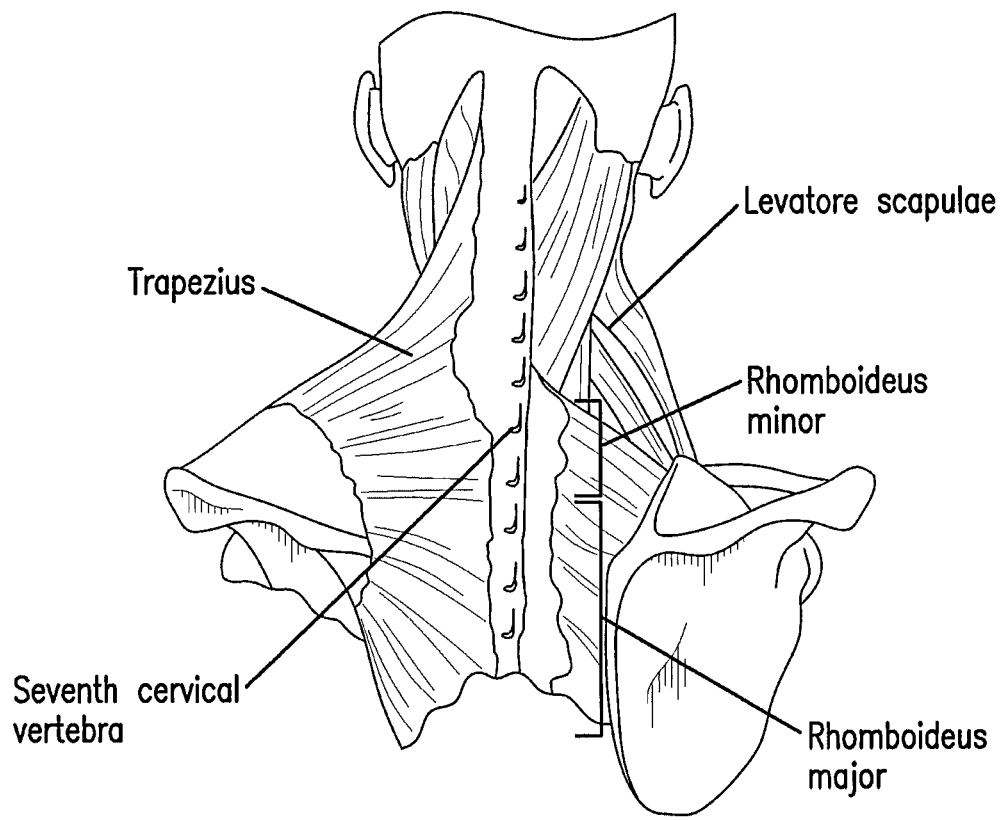
FIG. 3 shows muscles in the neck and shoulders prone to tension during the singing process.
Figure 4:
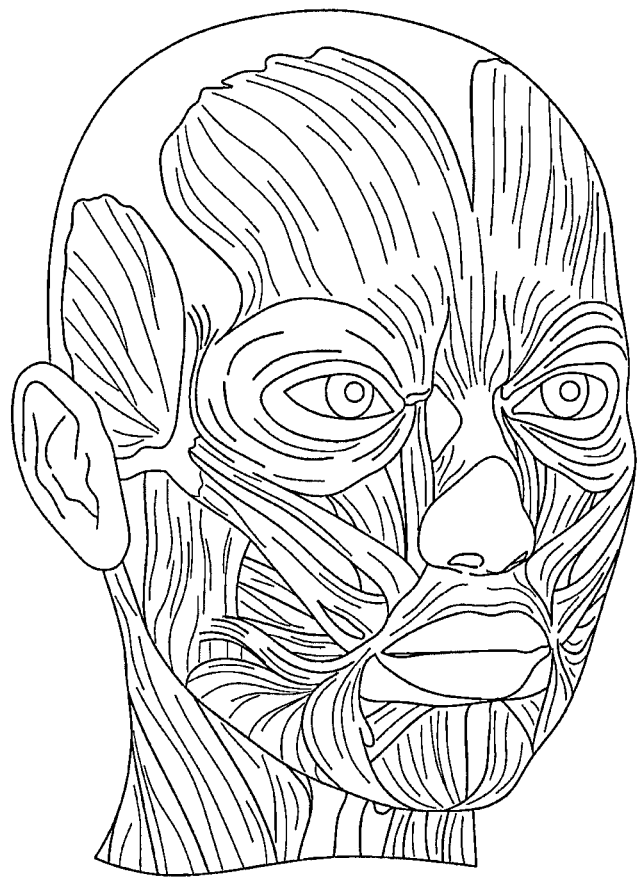
FIG. 4 shows facial muscles prone to tension during the singing process.

Using tension tracking, sEMG biofeedback from hyperfunctional muscles can be monitored and measured. Common areas of undesirable tension that occur in the singing process include: shoulder/trapezius, back of neck, mandibular, forehead, and suprahyoidal. A picture of a skinless human bust in posterior and anterior view with dots delineating electrode placement for the various regions listed above will appear in this function. Images similar to these could be used, as shown in FIGS. 3, 4).

In tension tracking mode the user can set threshold levels of $\mu V$ input, so that a visual or aural alarm sounds when they exceed the threshold level set. The scale of the graphic $\mu V$ display should be adjustable between 0-10 to 0-100 $\mu V$ using a "+" or "−" button to increase or decrease the scale to the particular user's liking. Unless changed by the user, the scale of the graphic display will be 0-35 $\mu V$. Because sEMG will register $\mu V$ even when the person is not tensing their muscles, a "calibrate" button will also be part of the software design to set the at-rest $\mu V$ input coming off ST/SH to "baseline" or "0" value on the graph.

sEMG recording: In either the tension tracking, or the larynx tracking functions of the software, there will be a "record" option available to allow the recording and playback of sEMG results, so that the biofeedback can be replayed and reviewed. This sEMG recording function can be coordinated to an audio recording function so one can see the sEMG biofeedback and its relation to the sound they were making and appearance while performing the vocalization.

Functions based on sound input from the computer or mobile device's onboard microphone include vibrato tracking using the vibrometer; resonance tracking using the focus meter, pitch tracking, and vowel tracking.

Functions based on video input from a camera are video recording. When using the video function, the vocalist and/or singer will position him/herself in front of the onboard camera of the computer or mobile device upon which the software is loaded, so that his/her face is centered in the camera display screen. This function will coordinate with the sEMG and audio recording functions, so that the user can see the video and μV biofeedback and observe how those data relate to their tone quality and sound.

The following functions based on typed user input. The user is prompted to answer a multiple choice question as part of the setup process before using the functions based on sound biofeedback. The question is: "Are you male or female?" For female users, the software can indicate whether the singer is in head voice or chest voice in the pitch range of C4-E5. Female head voice singing in this range generally presents less intensity in the harmonics 2,000 Hz and above. Chest voice singing on the same pitch will show an increase in harmonic intensity above 2,000 Hz and present more vocalist's or singer's formant cluster intensity. The words "chest voice," or "belt" would appear if a female singer's sound spectrum indicates high intensity harmonic activity above 2,000 Hz in the range between C4-E5.

The inventive method is used by any vocalist. The only requirements are basic knowledge of the location and muscle fiber orientation of targeted muscles, training to properly prepare the skin, place the electrodes, and operate the equipment; each of this is readily learned or self-taught, as known by one skilled in the art.

The following references are incorporated in their entirety:

Coffin, *Chromatic Vowel Chart for Voice Building and Tone Placing* (Metuchen, N.J.: Scarecrow Press, 1980); Hermens et al., "Development of recommendations for SEMG sensors and sensor placement procedures," *Journal of Electromyography and Kinesiology* 10: 361 -374, 2000; Merletti, R. Standards for reporting EMG data. *J. Electromyography and Kinesiology* 9(1): 3-4, 1999.

It should be understood that the embodiments of the present invention shown and described in the specification are only specific embodiments of inventor who is skilled in the art and are not limiting in any way. Therefore, various changes, modifications, or alterations to those embodiments may be made or resorted to without departing from the spirit of the invention in the scope of the following claims.

What is claimed is:

1. A non-transitory computer-readable medium tangibly embodying a program of instructions executable by a computer to perform a method of using biofeedback to instruct a user how to maintain a lower laryngeal position while vocalizing by increasing electromyographic (EMG) and surface electromyographic (sEMG) data received from the laryngeal depressor muscles, the program comprising:
   instructions for receiving electronic signals representing real-time EMG and sEMG data of the user;
   instructions for generating instructions to the user, based upon the received EMG and sEMG data, to at least double the EMG and sEMG data received from the laryngeal depressor muscles during an ensuing vocalization exercise;
   instructions for generating a display to the user of the generated instructions;
   instructions for converting subsequent EMG and sEMG data received from the user in response to the generated instructions during an ensuing vocalization exercise into a real-time sensory readout;
   instructions for receiving audio signals of the user during the ensuing vocalization exercise and converting the audio signals to spectrographic audio data;
   instructions for receiving video signals of the user during the ensuing vocalization exercise;
   instructions for coordinating recording of the subsequent EMG data, subsequent sEMG data, spectrographic audio data, and video signals;
   instructions for generating graphical information based on the subsequent EMG data, subsequent sEMG data, spectrographic audio data, and video signals received from the user; and
   instructions for displaying the generated graphical information to the user.

2. The non-transitory computer-readable medium of claim 1 further comprising instructions for exporting the EMG data, sEMG data, spectrographic audio data, and video signals to an external device.

3. The non-transitory computer-readable medium of claim 1 wherein the EMG and sEMG data received from laryngeal depressor muscles of the user upon which the instructions for generating are based is an initial range of EMG and sEMG data received from laryngeal depressor muscles of the user as previously measured between rest and vocalization of a sustained pitch.

4. An apparatus for using biofeedback to instruct a user how to maintain a lower laryngeal position while vocalizing by increasing the electromyographic (EMG) and surface electromyographic (sEMG) data received from the laryngeal depressor muscles, the apparatus comprising:
   an electromyographic device configured to detect real-time EMG and sEMG data, and to convert the EMG and sEMG data to electrical signals readable by a computer;
   a computer configured:
      to receive said electrical signals to generate instructions to the user, based upon EMG and sEMG data received by the electromyographic device from laryngeal depressor muscles of the user, to at least double the EMG and sEMG data received by the electromyographic device from the laryngeal depressor muscles of the user during an ensuing vocalization exercise;
      to generate a display of the generated instructions to the user; and
      to convert electrical signals for the EMG and sEMG data received by the electromyographic device from the laryngeal depressor muscles of the user to a real-time sensory readout;
   a vibrometer configured to record sound of the user, and convert the recorded sound to spectrographic audio data, frequency data, pitch data, and resonance data which are readable by the computer;
   a focus meter configured to receive the resonance data and provide the user with qualitative analysis of a harmonic spectrum of the recorded sound through visual feedback; and
   a display configured to receive the spectrographic audio data, pitch data and frequency data, and provide the user with real time visual feedback based on the received spectrographic audio data, pitch data and frequency data.

5. The apparatus of claim 4 further comprising
   an EMG laryngeal movement meter, which provides visual biofeedback regarding laryngeal movement;
   a vocalist interface configured to allow (i) the user to determine the extent the user's muscles are altered, (ii) the user to adjust a scale for displaying the graphical information, and (iii) the user to enter the user's demographic data;
   the display further configured to show an animation of a larynx moving up and down based on the sEMG data;
   the display further configured to show a picture of a human bust with dots delineating placement of the sEMG mechanism;

a video recorder; and the computer further configured to (i) receive video signals from the video recorder, and (ii) coordinate the video signals with the EMG, sEMG, and the spectrographic audio data for future playback.

6. The apparatus of claim 4 further comprising a tension reliever configured to use the real-time EMG data to alert the user when the tension reliever detects tension.

7. The apparatus of claim 4 further comprising an interface configured to allow the user to determine the extent the user's muscles are altered, to allow the user to adjust a scale for displaying the graphical information, or to allow the user to enter user demographic data.

8. The apparatus of claim 4 wherein the EMG and sEMG data received from laryngeal depressor muscles of the user upon which the instructions to at least double EMG and sEMG data are based is an initial range of EMG and sEMG data received by the electromyographic device from laryngeal depressor muscles of the user previously measured between rest and vocalization of a sustained pitch.

9. A computer-implemented vocalization system comprising:

a microphone;

a display; and a computer comprising a processor, a memory within which code for execution by the processor is stored, and instructions for analyzing vocalization data obtained from a vocalist, the instructions comprising instructions for;

obtaining visual feedback and qualitative analysis of a vibrato component of a vocalized tone sampled by a vibrometer component;

obtaining visual feedback and qualitative analysis of a harmonic spectrum of a vocalized tone sampled by a focus meter component; and obtaining visual feedback and qualitative analysis of the bioelectric potential of laryngeal depressor muscles of a vocalist sampled by an electromyographic (EMG) component operatively connected to a plurality of computer-connected surface electromyography electrodes;

wherein the instructions for obtaining visual feedback and qualitative analysis of said bioelectric potential are configured, based upon an initially measured range of bioelectric potential of the laryngeal depressor muscles of the vocalist, to generate instructions to the vocalist to at least double that initially measured range of bioelectric potential of the laryngeal depressor muscles during an ensuing vocalization exercise, and to display the generated instructions upon the display, whereby the vocalist cultivates a lower laryngeal position by increasing a subsequently measured range of bioelectric potential of the laryngeal depressor muscles of the vocalist toward the at least doubled initially measured range of bioelectric potential of the laryngeal depressor muscles in response to the generated instructions during the ensuing vocalization exercise.

* * * * *